US009485309B2

(12) United States Patent
Shishkin et al.

(10) Patent No.: US 9,485,309 B2
(45) Date of Patent: Nov. 1, 2016

(54) OPTIMAL FAIR DISTRIBUTION AMONG BUCKETS OF DIFFERENT CAPACITIES

(71) Applicant: Red Hat, Inc., Raleigh, NC (US)

(72) Inventors: Eduard Shishkin, Brno (CZ); Anton Arapov, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 456 days.

(21) Appl. No.: 13/827,414

(22) Filed: Mar. 14, 2013

(65) Prior Publication Data

US 2014/0280438 A1 Sep. 18, 2014

(51) Int. Cl.
*G06F 15/16* (2006.01)
*H04L 29/08* (2006.01)

(52) U.S. Cl.
CPC ....... *H04L 67/1097* (2013.01); *H04L 67/1008* (2013.01)

(58) Field of Classification Search
CPC ........................ H04L 67/10; H04L 67/1008
USPC ................................................ 709/201, 225
See application file for complete search history.

(56) References Cited

U.S. PATENT DOCUMENTS 6,748,437 B1 * 6/2004 Mankude et al. ............ 709/227
7,126,910 B1 * 10/2006 Sridhar ......................... 370/229
7,453,804 B1 * 11/2008 Feroz .................. H04L 12/5693
  370/229
8,296,434 B1 * 10/2012 Miller et al. .................. 709/226
2009/0089630 A1 * 4/2009 Goldenberg ...... G06F 17/30536
  714/704
2010/0106934 A1 * 4/2010 Calder et al. ................. 711/173

OTHER PUBLICATIONS

Karger et al, "Consistent Hashing and Random Trees: Distributed Caching Protocols for Relieving Hot Spots on The World Wide Web", 1997, 10 pages.

* cited by examiner

*Primary Examiner* — Jason Recek
(74) *Attorney, Agent, or Firm* — Lowenstein Sandler LLP

(57) ABSTRACT

A processing device can implement an optimal fair distribution. In one embodiment, the processing device divides a distribution pattern associated with a distributed system into segments based on a quality of distribution for the distributed system. For each partition of the plurality of partitions, the processing device calculates a weight for the partition based on a number of segments in the plurality of segments and a capacity of a bucket associated with the partition. The processing device generates a map of partitions based on the weight for each of the plurality of partitions. The processing device distributes a plurality of objects in the distributed system to the plurality of buckets based on the map of partitions.

21 Claims, 8 Drawing Sheets

OPTIMAL FAIR DISTRIBUTION AMONG BUCKETS OF DIFFERENT CAPACITIES

TECHNICAL FIELD

Embodiments of the present disclosure relate to distributed systems, and more particularly, to a technique for optimal fair distribution among buckets of different capacities in a distributed system.

BACKGROUND

A distributed system may include multiple storage servers, each of which may control one or more storage resources, such as disks and/or memory. Each of the storage servers may use local systems (e.g., a disk file systems) to manage the storage of data on its storage resources. Any pair of server and storage resource determines a physical storage unit, which is also called bucket. The distributed system may layer on top of, and interface with, the local systems.

Most modern distributed file systems perform distribution of named objects (e.g., files) by mapping the named objects to the physical storage units or buckets. The mapping of each of the named objects to a bucket can be performed by mapping the name of the named object to a pattern and then mapping the pattern to a bucket. The patterns of the names of the named objects can be represented by a distribution pattern. The distribution pattern can be associated with a space of slots (e.g., ordered slots). The number of slots associated with the distribution pattern can be larger than the number of physical storage units (buckets). The distribution pattern can be divided, or partitioned, into partitions. The distribution pattern can include a mapping function (e.g., a hash function, a well-mixed hash function, etc.) to map the named objects to the patterns and the distribution pattern can distribute the patterns to buckets using various methods.

Current methods of distribution represent the space of slots associated with the distribution pattern as a circle on a plane, and the distribution pattern can distribute the named objects using the circle on the plane. Partitioning with polygons can set points on the circle such that every partition is represented as an arc between two different neighboring points (vertexes). Partitioning with regular polygons can set points on the circle such that the circle is split into equal arcs and the regular polygons have at least one common vertex based on the points. Partitioning with random polygons can sets random points on the circle such that any two N and (N+1)-polygons have N common vertexes. Partitioning with compound random N-polygons can set N*M random points on the circle such that every partition is composed of M arcs randomly scattered along the circle. Partitioning by halving can set points on the circle such that every next point splits the maximal arc into different parts (e.g., 2 equal parts). However, these current approaches to distribution of named objects may provide desirable quality but not good performance, or may provide desirable performance but not good quality. Moreover, once a distribution is selected, the quality of the distribution cannot be updated.

BRIEF DESCRIPTION OF THE DRAWINGS

Various embodiments of the present disclosure will be understood more fully from the detailed description given below and from the accompanying drawings of various embodiments of the disclosure.

DETAILED DESCRIPTION

Figure 1:
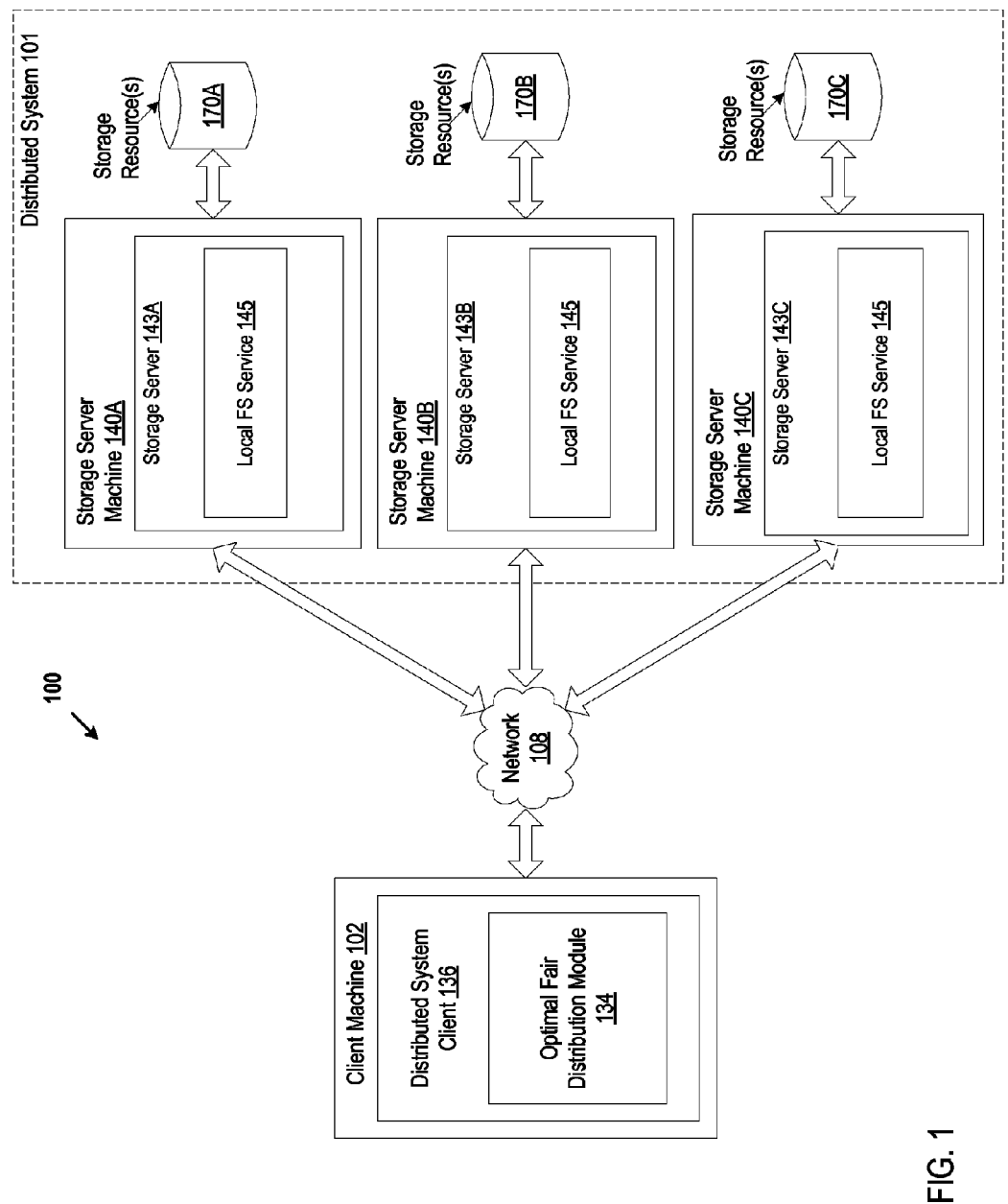
FIG. 1 illustrates exemplary system architecture, in accordance with various embodiments of the present disclosure.

Embodiments of the disclosure are directed to a method and system for optimal fair distribution among buckets of different capacities in a distributed system.

A distributed system can be defined by the performance of the distributed system, the quality of the distributed system, and the cost of the distributed system. The performance of a distributed system can be defined by the cost of re-balancing named objects (e.g., files) among buckets (physical storage unit, node, etc.) of the distributed system after a bucket has been added to or removed from the distributed system. The quality of the distributed system can be defined by the efficiency of a distributed system, such as the efficient use of the buckets available to the distributed system. The cost of the distributed system can be defined by the memory footprint required by the distributed system to keep the partitioning, such as the size of in-memory system maps required by the distributed system.

A distributed system can include multiple buckets (e.g., server and storage resource pairs, nodes, etc.) to which the distributed system can distribute named objects (e.g., files). Each bucket can have a specific capacity. The distributed system can determine which bucket to distribute a named object to by a distribution pattern, which maps the named object to a pattern using a function and maps the pattern to a bucket. The distribution pattern, such as an L-ring, can represent a slot of spaces for the patterns associated with the named objects, and can be divided into partitions. For example, the distribution pattern can be any partitioned L-ring. The quality of the distribution can be a measure of the uniformity of filling buckets of the distributed system by the distribution pattern. Low quality of distribution leads to situations where one bucket has a lot of free space, while another bucket is already full, or exhausted. In such situations, the free space of other buckets may no longer be used because of the inability to add objects to the full bucket. Therefore, the quality of the distribution can measure the efficiency of space usage in a distributed file system. High quality of distribution can mean efficient space usage. The quality of distribution provided by a distributed system can be defined as the low boundary of the quality of all layouts created by the distributed system for every set of named objects (e.g., files) in the distributed system.

Embodiments of the present disclosure provide an optimal fair distribution among buckets of different capacities in the distributed system to maximize the performance of the distributed system and quality of the distributed system, while minimizing the cost of the distributed system. Moreover, the optimal fair distribution in the distributed system can permit a user to resize the distributed system by changing the capacity of the distributed system. Therefore, if the user decides that the distributed system requires more or less capacity, the user can resize the distributed system on demand without a significant performance impact because very few of the named objects in the distributed system will need to be moved. Furthermore, the optimal fair distribution can allow a user to change the quality of distribution after the distribution has been selected. Therefore, after the optimal fair distribution has been selected, if the user decides that the system has been initialized with a quality of distribution that is higher than the user would like (e.g., the system tables of the distributed system are too large and use too much storage) or lower than the user would like (e.g., the distributed system is not using the storage space as efficiently as the user would like), the user can change the quality of distribution. For example, the efficiency of the storage space can be defined by how evenly objects are distributed across the buckets in the distributed system, by the percentage of each bucket in the distributed system that is in use, etc.

The optimal fair distribution among buckets of different capacities can divide, or split, the distribution pattern associated with the distributed system into segments based on the quality of distribution. The distribution pattern can include a number of partitions that is equal to the number of buckets in the distributed system, such that each partition of the distribution pattern corresponds to a bucket of the distributed system. For every partition, a weight of the partition is calculated based on the number of segments in the distribution pattern and a capacity of the bucket corresponding to the partition. Each partition can be assigned a number of segments based on the weight of the partition. A map of partitions is generated based on the weight of each partition. The map of partitions is a mapping of each segment in the distributed system to the partition that is assigned the segment. The optimal fair distribution can distribute the named objects in the distributed system to the buckets in the distributed system based on the map of partitions.

When the number of buckets in the distributed system is updated, the weight for every partition in the distribution pattern is updated and the number of segments for each partition is recalculated based on the updated weights, the map of partitions and map of segments are updated based on the updated weights, and the named objects in the distributed system are rebalanced based on the updated map of partitions. Moreover, when the distributed system is resized, the weights for every partition is updated, the size of the map of partitions is updated, the map of partitions is updated based on the updated weights, and the named objects in the distributed system are rebalanced based on the updated map of partitions. Furthermore, when the quality of distribution of the distributed system is changed or updated, the distributed system is resized based on the updated quality of distribution. The capacity of the distributed system is updated to the value of the capacity before the distributed system was resized and the quality of distribution of the distribution pattern is updated.

FIG. 1 is an example system architecture 100 for various implementations. The system architecture 100 can include a distributed system 101 coupled to one or more client machines 102 via a network 108. The network 108 may be a public network (e.g., the Internet), a private network (e.g., a local area network (LAN) or wide area network (WAN), or a combination thereof. Network 108 can include a wireless infrastructure, which may be provided by one or multiple wireless communications systems, such as a wireless fidelity (WiFi) hotspot connected with the network 108 and/or a wireless carrier system that can be implemented using various data processing equipment, communication towers, etc.

The distributed system 101 can be a network attached storage file system that includes one or more storage server machines 140A-C, each of which may control any number of storage resources 170A-C. A storage server machine 140A-C can include a network-accessible server-based functionality (e.g., storage server 143A-C). The storage server machines 140A-C can include, and are not limited to, any data processing device, such as a desktop computer, a laptop computer, a mainframe computer, a personal digital assistant, a rackmount server, a handheld device or any other device configured to process data. The storage server machines 140A-C of the distributed system 101 may be grouped into one or more clusters. A cluster is a group of linked storage servers 143A-C working together closely.

The storage resources 170A-C may be mass storage devices, such as magnetic or optical storage based disks, solid-state drives (SSDs) or hard drives, coupled to the storage server machines 140A-C (either directly or via the network 108). The storage resources 170A-C may also include memory such as random access memory (RAM), flash memory, and so forth. For convenience, some embodiments provided herein may be described with reference to disks or other mass storage devices. However, it should be understood that such embodiments may also apply to memory storage resources.

Storage servers 143A-C each include an instance of a local file system (FS) service 145. The local FS service 145 can create directories on the storage resources 170A-C, store data on the storage resources 170A-C, read data from the storage resources 170A-C, and perform other standard file operations. The local file system service 145 instances additionally interface with one another and/or a file system client 136 to form the distributed system 101, where each store server 143A-C acts as a bucket or node of the distributed system 101.

The local file system services 145, and thus the distributed system 101, can store data as named objects, or files, and can include directories, also referred to as folders, which are virtual containers within the distributed system 101. Groups of computer files and possibly other sub-directories can be kept and organized within the directories. A sub-directory, also referred to as a sub-folder, is a directory contained inside another directory. The top-most directory is referred to as a root or top-level directory within the distributed system 101. Together, the directories form a hierarchy, or tree structure, of one or more levels in the distributed system 101.

The distributed system 101 can organize data (e.g., named objects) in the disks 170A-C using sub-volumes. A volume may be an instance of the distributed system 101. A volume can include sub-volumes, which can be resident on one or more directories of hardware resources 170A-C (e.g., of a hard disk). A sub-volume can be a representation of one or more logical locations, rather than physical locations, of storage areas in the distributed system 101. For example, a physical hard disk-1 may have two directories, directory-1 and directory-2. A sub-volume label "C:" may be assigned to directory-1 and a sub-volume label "D:" may be assigned to directory-2. Hard disk-1 is a physical disk and "C:" and "D:" are sub-volumes representing logical locations on physical hard disk-1. Each of the sub-volumes may be a logical and/or physical location. A single volume may be mounted by client machine 102 to gain access to the entire distributed system spread over multiple sub-volumes.

Each storage server 143A-C can be physical storage unit or node in the distributed system 101, and can be represented by a bucket, which is an abstraction of the physical storage unit or node. Each bucket has a capacity that is a non-zero positive integer number (e.g., size of the partition) and a set of 4 methods: lookup an object, list, add an object, and remove an object. The lookup an object method can return a true value (Boolean true, positive value, etc.) if the bucket contains an object with a provided name and a false value (Boolean false, negative value, zero value, etc.) if the bucket does not contain an object with a provided name. For example, lookup("foo") returns Boolean value true if the bucket contains object "foo" and Boolean value false if the bucket does not contain object "foo". The list method can return a list of names of all the objects in the bucket. For example, if the bucket C includes objects A and B, the list method will return a list including A and B. The add an object method can add an object to the bucket. For example, add("foo") for bucket C will add the object named "foo" to the bucket C. The remove method can remove an object from the bucket. For example, remove ("foo") for bucket C will remove the object named "foo" from the bucket C.

A mounted directory or sub-volume, also referred to as a brick, can be a basic unit of storage, represented by an export directory on a storage server 143A-C. A brick can be assigned to a volume. When a brick is processed, for example, by a translator, which can configure the brick, the brick becomes a sub-volume. A brick (sub-volume) can be described using a server identifier with an export directory identifier. One or more bricks (sub-volumes) can be added to a volume to increase the distribution of data amongst volumes and/or sub-volumes and to add to the capacity of the volume.

Any number of client machines 102 can include a distributed system client 136 to communicate with the storage servers 143A-C in the distributed system 101. The client machine 102 may be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The distributed system client 136 can mount the distributed system 101 via a mount point to access the data associated with a particular tenant in the distributed system 101. For example, the distributed system client 136 may be configured to mount the distributed system 101 using a volume identifier (e.g., volume label) and a file path that is stored in configuration data.

The distributed system client 136 may include an optimal fair distribution module 134 that performs a distribution of named objects in the distributed system 101 based on a quality of distribution. The optimal fair distribution module 134 can initialize an optimal fair distribution for a distributed system by dividing a distribution pattern associated with the distributed system 101 into a number of segments based on an initial quality of distribution and an initial capacity of the distributed system 101. For example, the initial capacity of the distributed system 101 is the number of buckets initially in the distributed system 101. The optimal fair distribution module 134 can determine a number of segments for each partition in the distribution pattern based on the capacity of the bucket corresponding to the partition in relation to the overall capacity of the distributed system 101 and distribute the named objects to the buckets based on the number of segments in each partition.

The optimal fair distribution module 134 can receive a request to change the number of buckets in the optimal fair distribution for the distributed system 101, such as from a user or administrator of the client machine 102. The optimal fair distribution module 134 can change the number of buckets in response to the request. The optimal fair distribution module 134 can receive a request to resize the distributed system 101, such as from a user or administrator of the client machine 102. The optimal fair distribution module 134 can resize the distributed system 101 in response to the request. The optimal fair distribution module 134 can receive a request to change the quality of distribution in the optimal fair distribution for the distributed system 101, such as from a user or administrator of the client machine 102. The optimal fair distribution module 134 can change the quality of the distribution based on a request. The optimal fair distribution module 134 can receive a request to perform an operation associated with an object in the distributed system 101, such as from a user or administrator of the client machine 102. The optimal fair distribution module 134 can perform the operation associated with the object based on the request. Implementations of the optimal fair distribution module 134 are described in greater detail below in conjunction with FIG. 2.

In some embodiments, the optimal fair distribution module 134 may be included in one or more of the storage servers 143A-C rather than as part of the distributed system client 136 on client machine 102. In some embodiments, the optimal fair distribution module 134 can be included in one or more of the servers 143A-C and the distributed system client 136 on client machine 102. In these embodiments, part of the functionality of the optimal fair distribution module (e.g., changing the number of buckets, resizing the distributed system 101, changing the quality of the distribution) can be performed by the optimal fair distribution module 134 included in the one or more of the servers 143A-C and part of the functionality of the optimal fair distribution module (e.g., perform an operation associated with an object) can be performed by the optimal fair distribution module 134 included in the distributed system client 136 on client machine 102.

Figure 2:
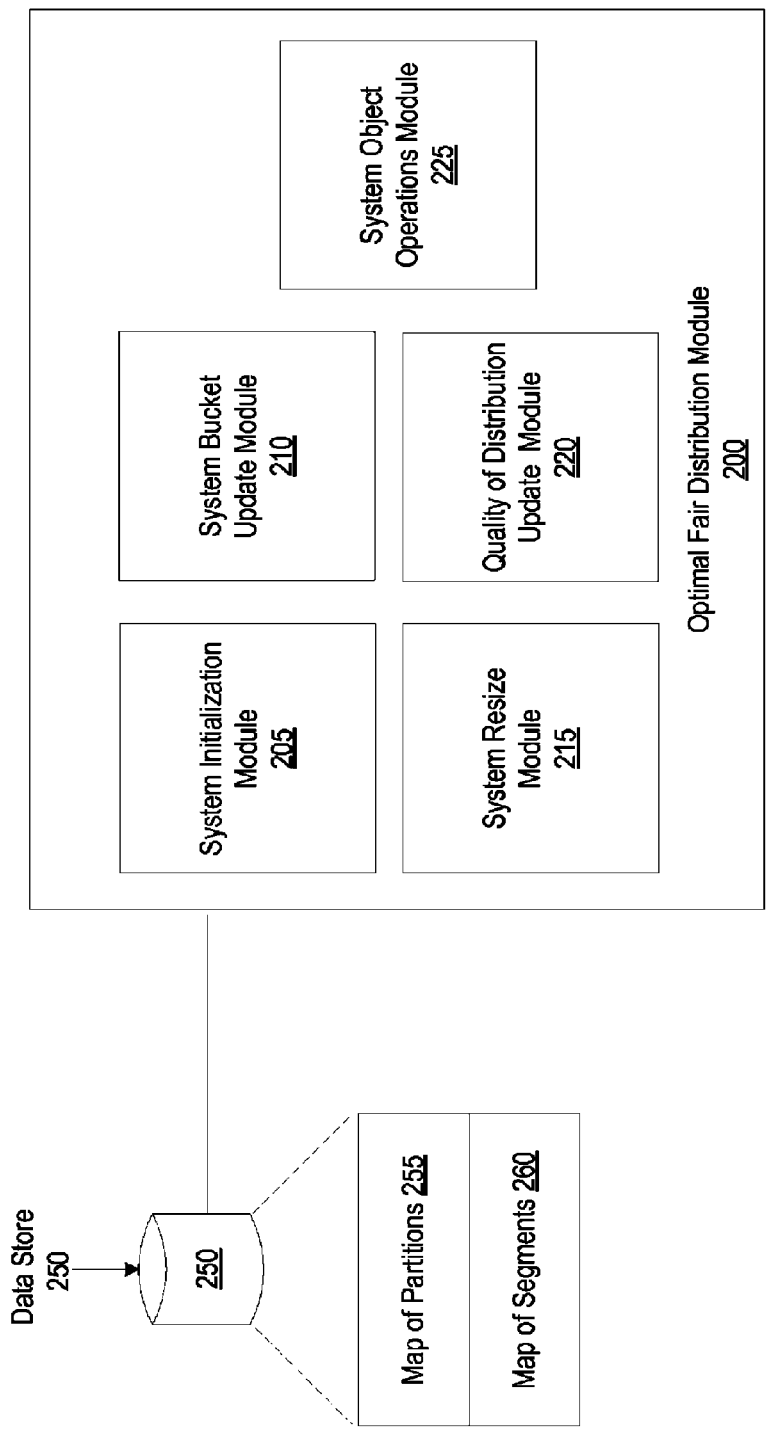
FIG. 2 is a block diagram of an optimal fair distribution module, in accordance with an embodiment.

FIG. 2 is a block diagram of an optimal fair distribution module 200, in accordance with one embodiment of the present disclosure. The optimal fair distribution module 200 includes a system initialization module 205, a system bucket update module 210, a system resize module 215, a quality of distribution update module 220, and a system object operations module 225. Note that in alternative embodiments, the functionality of one or more of the system initialization module 205, the system bucket update module 210, the system resize module 215, the quality of distribution update module 220, and the system object operations module 225 may be combined or divided.

The patterns of named objects in a distributed system can represent a space of slots. The space of slots can be represented by a distribution pattern, such as any partitioned L-ring, and can be divided into a number of partitions that is equal to the number of buckets in the distributed system.

Each partition in the distribution pattern can correspond to a bucket in the distributed system. The system initialization module 205 can initialize an optimal fair distribution for the distributed system. To initialize the distributed system, the system initialization module 205 can divide the distribution pattern associated with a distributed system into a number of segments based on an initial quality of distribution. The initial quality of distribution can define how efficiently the buckets in the distributed system should be used. The initial quality of distribution can be a default value or can be provided by a user or administrator of the distributed system. Upon dividing the distribution pattern associated with the distributed system into a number of segments, the system initialization module 205 can calculate a weight of each partition in the distribution pattern. The weight of a partition can represent the number of segments in the partition in relation to the total number of segments and the capacity of the bucket corresponding to the partition. Therefore, partitions of different sizes will have different weights because the number of segments assigned to the partitions will be different.

The system initialization module 205 can further initialize the optimal fair distribution for the distributed system by generating a map of partitions and a map of segments based on the weights of the partitions. The map of partitions is a system map that can map each segment in the distribution pattern to the partition that contains the segment. For example, if partition 1 includes segments 2, 3, and 4, then the map of partitions will associate a value of 1 with the segments 2, 3, and 4. The system initialization module 205 can store the map of partitions in storage, such as map of partitions 255 in data store 250. The map of segments is a system map that can map each partition to a set of all segments contained in the partition. For example, if partition 1 includes segments 2, 3, and 4, the map of segments will include a list of 2, 3, and 4 as being associated with (e.g., belonging to) partition 1. The initialization module can store the map of segments in storage, such as map of segments 260 in data store 250.

The system bucket update module 210 can update the number of buckets in an optimal fair distribution for a distributed system. The system bucket update module 210 can update the number of buckets in response to a request to add or remove one or more buckets in the distributed system. The system bucket update module 210 can update a representation of the buckets based on the updated number of buckets. Upon updating the representation of the buckets, the system bucket update module 210 can update the weights of the partitions based on the updated number of buckets, and therefore the updated capacity of the distributed system. The system bucket update module 210 can update the weights of the partitions by calculating an updated weight for each partition corresponding to the updated number of buckets. The system bucket update module 210 can then update the map of partitions, such as map of partitions 255, and the map of segments, such as map of segments 260, based on the updated weights for the partitions. The system bucket update module 210 can update the map of partitions and the map of segments based on a defect value for each partition, which represents the number of segments in the distribution pattern that will be reassigned based on the change in the number of buckets.

The system resize module 215 can change the size of a distributed system by updating the capacity of the distributed system. The system resize module 215 can change the size of the distributed system based on a request that includes a factor by which to change the size of the system.

The system resize module 215 can update the map of partitions, such as map of partitions 255, and the map of segments, such as map of segments 260, based on the factor. If the request is to increase the size of the system, the system resize module 215 can update the map of partitions and the map of segments by allocating additional elements for of the map of partitions and allocating additional storage for the map of segments, and assigning additional segments to each partition in the distribution pattern. If the request is to decrease the size of the system, the system resize module 215 can update the map of partitions and the map of segments by deallocating elements from the map of partitions and deallocating storage from the map of segments based on the decrease factor, and removing segments from each partition in the distribution pattern.

The system resize module 215 can update the weights of the partitions based on the factor, and can update the updated map of partitions and the updated map of segments based on the updated weights of the partitions. The system resize module 215 can rebalance the named objects in the distributed system based on the updated map of partitions.

The quality of distribution update module 220 can change the quality of distribution for a distributed system. The quality of distribution update module 220 can change the quality of distribution for the distributed system based on a request that includes a factor by which to change the quality of distribution. The quality of distribution update module 220 can resize the distributed system based on the factor by sending a request to the system resize module 215 including the factor. Once the distributed system has been resized by the system resize module 215, the quality of distribution update module 220 can update the capacity of the distributed system to a previous value and can update the quality of the distribution based on the factor. Therefore, because the quality of the distributed file system has changed in the distributed system because the distributed system has been resized, but the capacity associated with the distribution pattern has not changed. If the quality of distribution was increased, then the larger map of partitions and larger map of segments will support the higher quality of distribution. If the quality of distribution was decreased, then the smaller map of partitions and shrunk map of segments will support the smaller quality of distribution and require less memory.

The system object operations module 225 can perform an operation associated with an object. The system object operations module 225 can perform the operation associated with an object based on the operation (e.g., add, remove, list, lookup, etc.) based on a request that includes the operation and the name of the object. The system object operations module 225 can calculate a number of a segment based on the name of the object and determine a number of a partition based on the number of the segment. The system object operations module 225 can perform the operation associated with the object using a bucket that corresponds to the partition.

Figure 3:
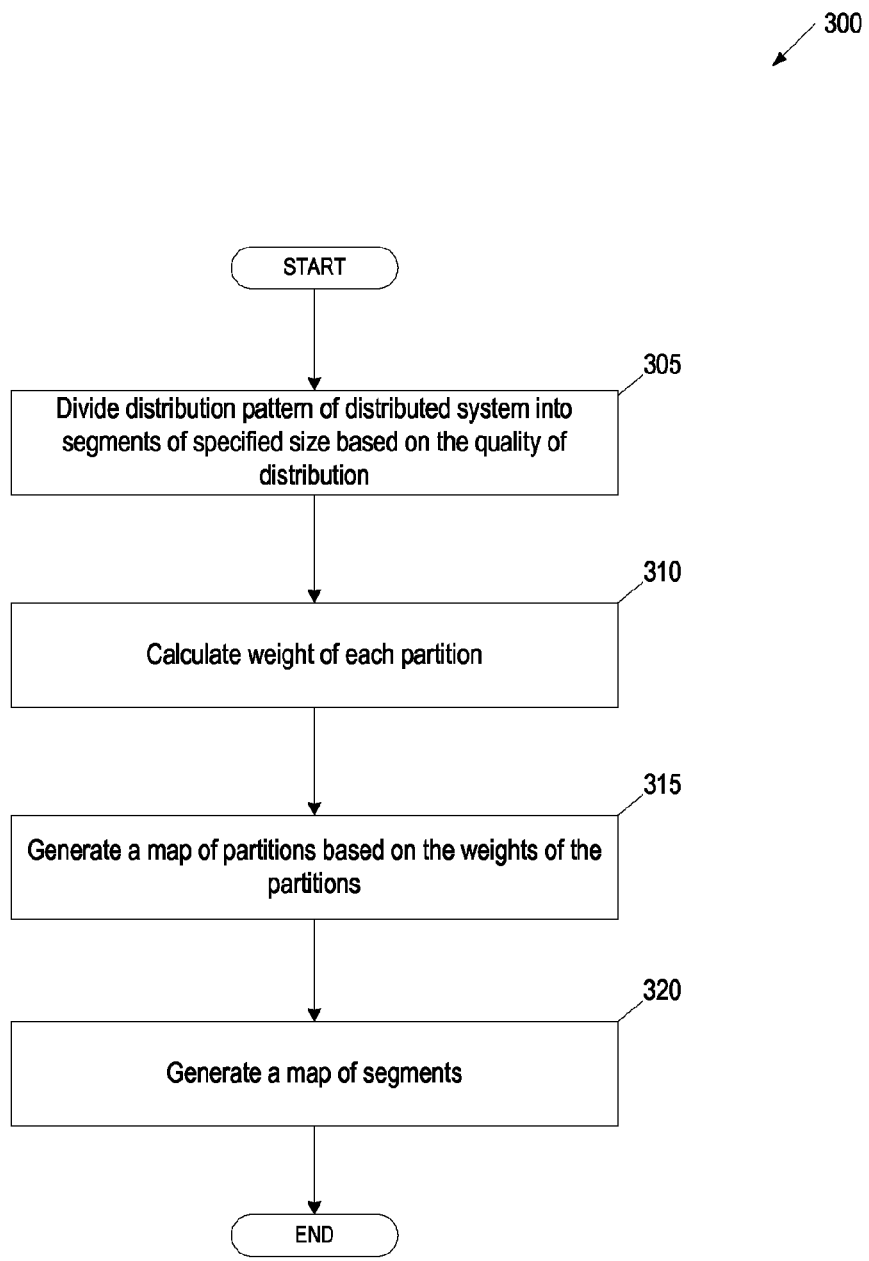
FIG. 3 is a flow diagram illustrating an embodiment for a method of initializing an optimal fair distribution among buckets of different capacities in a distributed file system, in accordance with an embodiment.

FIG. 3 is a flow diagram of an embodiment of a method 300 of initializing an optimal fair distribution among buckets of different capacities in a distributed system. The method 300 is performed by processing logic that may comprise hardware (circuitry, dedicated logic, etc.), software (such as is run on a general purpose computer system or a dedicated machine), or a combination of both. In one embodiment, the method 300 is performed by the OCFD module 200 of FIG. 2.

At block 305, processing logic divides a distribution pattern of a distributed system into segments of a specified size based on a quality of distribution. In one embodiment, the distribution pattern of the distributed system is any partitioned L-ring. The distribution pattern can include a mapping function to map names, such as names of named objects in a distributed system, to patterns. In one embodiment, the distribution pattern is an L-ring that can be determined by a pair (L, phi), with L is any set of slots and phi is a random function on the L which has a discrete uniform distribution. In one example, L is a power of two. In an alternate embodiment, the distribution pattern of the distributed system is represented by a consistent hash space. The distribution pattern of a distributed system can be made up of partitions, such that N-partitioning on the distribution pattern is an ordered set of disjoint partitions. For example, a distribution pattern with 4-partitioning is an ordered set of 4 disjoint partitions in the distribution pattern. The number of partitions that make up the distribution pattern can be based on the number of buckets in the distributed system, such that there is a partition for each bucket in the distributed system. The size of each partition can be based on the capacity of the bucket to which the partition corresponds.

The quality of distribution of a distributed system can define how efficiently the distribution pattern utilizes the buckets of the distributed system. The quality of distribution of a distributed system can be provided by a user, by a computing system, etc. Processing logic can divided the distribution pattern of the distributed system into a number of segments based on the quality of distribution. Processing logic can calculate the number of segments by calculating a granulation factor and dividing the distribution pattern into a number of segments equal to the granulation factor. For example, the granulation factor, T, can be calculated as:

T=Q*Z, where

Q=quality of distribution

Z=capacity of the distributed system in buckets (maximum number of buckets in the distributed system).

For example, for a distributed system with quality Q=2 and capacity Z=16, the granulation factor T=2*16=32. In this example, the distribution pattern will be divided into 32 segments. In one embodiment, the distribution pattern is an L-ring and the distribution pattern is divided into a number of segments equal to the granulation factor, such that:

$$L\text{-ring}=\{s0,s1,\ldots,s(T-1)\}=\{[0,L/T),[L/T,2L/T),\ldots,[L/T-1)L/T,L)\}, \text{ where}$$

L is a number of slots in the L-ring, each segment sk={k*L/T, . . . , (k+1)*L/T−1} is a set of L/T slots, k=0, . . . , T−1, and each segment is assigned a number or identifier from 0 to T−1.

At block 310, processing logic calculates a weight of each partition in the distribution pattern. The weight of a partition can represent the number of segments in the partition based on the capacity of the bucket corresponding to the partition. In one embodiment, the bucket corresponding to the partition has a capacity equal to the size (e.g., in bytes) of the partition. For example, if a partition is 19 bytes, the capacity of the bucket representing the partition is 19. The initial weight of a partition can be based on the capacity of the bucket corresponding to the partition, the total number of segments in the distribution pattern (equal to the granulation factor), and the total capacity of all the buckets in the distributed system. In one embodiment, the initial weight of a partition is calculated as:

initial weight of partition=(total number of segments*capacity of bucket corresponding to the partition)/(total capacity of all buckets).

For example, a distributed system has 5 buckets: bucket 0 with capacity=19, bucket 1 with capacity=7, bucket 2 with capacity=12, bucket 3 with capacity=8, and bucket 4 with capacity=23. For this example, the total capacity of the buckets is 19+7+12+8+23=69. Therefore, the initial weight of each partition is:

initial weight of partition 0=(32*19)/69=8 initial weight of partition 1=(32*7)/69=3 initial weight of partition 2=(32*12)/69=5 initial weight of partition 3=(32*8)/69=3 initial weight of partition 4=(32*23)/69=10

In some embodiments, to calculate the weight of each partition, processing logic can normalize the initial weight of each partition corresponding to the bucket to ensure that all segments of the distribution pattern are accounted for in the weights of the partitions. Processing logic can determine if all the segments of the distribution pattern are accounted for by calculating the total (e.g., sum) of the weights of the partitions and comparing the total of weights of the partitions to the total number of segments. If processing logic determines that all of the segments are not accounted for in the weights of the partitions (e.g., by determining that the total of the weights of the partitions is less than the total number of segments), processing logic can normalize (e.g., increase) the value of the initial weights of one or more of the partitions. Using the previous example, where the initial weights of the partitions were 8, 3, 5, 3, and 10, and the total number of segments was 32, processing logic will determine there are 3 segments (32−(8+3+5+3+10)=3) that are not accounted for in the weights of the partitions. In this example, processing logic adjusts the initial weights of the first 3 partitions to receive an additional segment and stores the adjusted weights of the first 3 partitions and the initial weights of the last 2 partitions. Therefore, the weight of partition 0=initial weight of partition 0+1=8+1=9, the weight of partition 1=initial weight of partition 1+1=3+1=4, the weight of partition 2=initial weight of partition 2+1=5+1=6, the weight of bucket 3=initial weight of partition 3=3, and the weight of partition 4=initial weight of partition 4=10. In other embodiments, the initial weights of the partitions can be normalized in other ways without departing from the scope of the current disclosure.

At block 315, processing logic generates a map of partitions based on the weights of the partitions. The map of partitions is a system map that can include a mapping of each segment to the partition that contains the segment. Thus, the map of partitions can include a number of elements that is equal to the number of segments in the distribution pattern, with each element representing a segment, and the value of each element representing the partition that the segment is in. For example, map_of_partitions[segment j] is the partition that contains the j-th segment in the distribution pattern. Thus, if segment 5 is in partition 1, then map_of_partitions[segment 5]=partition 1. Processing logic can generate the map of partitions by allocating an array of elements with a number of elements equal to the number of segments in the distribution pattern, and initializing the array based on the weights of the partitions. Processing logic can initialize the array based on the weights of the partitions by assigning (e.g., storing) an identifier (e.g., number) of a partition to a number of elements in the array equal to the weight of the partition for each of the partitions. For example, for a distribution pattern with 5 partitions and the weights of the previous example (9, 4, 6, 3, and 10), the map of partitions is initialized as:

map_of_partitions={0 0 0 0 0 0 0 0 0 1 1 1 1 2 2 2 2 2 2 3 3 3 4 4 4 4 4 4 4 4 4 4}, such that partition 0 has 9 segments in the map of partitions (elements 0-8 of the array), partition 1 has 4 segments in the map of partitions (elements 9-12 of the array), partition 2 has 6 segments in the map of partitions (elements 13-18 of the array), partition 3 has 3 segments in the map of partitions (elements 19-21 of the array), and partition 4 has 10 partitions in the map of partitions (elements 22-31 of the array).

At block 320, processing logic generates a map of segments. The map of segments is a system map that includes a mapping of each partition to a set of all segments contained in the partition. The map of segments can be used to increase the speed of performing operations, such as operations that change the number of buckets in a distributed system, resize a distributed system, etc. In one embodiment, the map of segments can be generated by allocating an array with a number of elements that is equal to the number of segments in the distribution pattern and initializing the elements based on the map of partitions. In this embodiment, the elements of the array are grouped in such a way that the segments contained in a particular partition are grouped together. For example, map_of_segments[partition j] is a list of segments contained in partition j. For example, for a distribution pattern with 32 segments and map of partitions{0 0 0 0 0 0 0 0 1 1 1 1 2 2 2 2 2 2 3 3 3 4 4 4 4 4 4 4 4 4}, the map of segments is initialized as:

map_of_segments={0 1 2 3 4 5 6 7 8 9 10 11 12 13 14 15 16 17 18 19 20 21 22 23 34 25 26 27 28 29 30 31}, such that the segments 0-8 for partition 0 are grouped together, segments 9-12 for partition 1 are grouped together, segments 13-18 for partition 2 are grouped together, segments 19-22 for partition 3 are grouped together, and segments 22-31 for partition 4 are grouped together.

In an alternate embodiment, the map of segments can be generated by allocating a table with a number of columns equal to the number of partitions and initializing each column to include the segments contained in the partition corresponding to the column. In one embodiment, processing logic can determine the segments contained in each partition from the map of partitions. For example, for a distribution pattern with 32 segments and map of partitions {0 0 0 0 0 0 0 0 0 1 1 1 1 2 2 2 2 2 2 3 3 3 4 4 4 4 4 4 4 4 4}, the map of segments is initialized as a table:

TABLE 1

Map of segments

| Partition 0 | Partition 1 | Partition 2 | Partition 3 | Partition 4 |
|---|---|---|---|---|
|   |   |   |   | 31 |
| 8 |   |   |   | 30 |
| 7 |   |   |   | 29 |
| 6 |   |   |   | 28 |
| 5 |   | 18 |   | 27 |
| 4 |   | 17 |   | 26 |
| 3 | 12 | 16 |   | 25 |
| 2 | 11 | 15 | 21 | 24 |
| 1 | 10 | 14 | 20 | 23 |
| 0 | 9 | 13 | 19 | 22 |

In some embodiments, upon initializing an optimal fair distribution among buckets of different capacities, processing logic assigns the segments in the distribution pattern to the partitions in the distribution pattern based on the map of partitions and the map of segments. Moreover, in some embodiments, processing logic can distribute objects in the distributed system to buckets based on the map of partitions. The objects in the distributed system can be named objects, such as files. Processing logic can distribute the objects in the distributed system to buckets by adding the objects to the buckets in the distributed system. To add an object to the distributed system, processing logic can determine a slot for the object, determine a segment which contains the slot, determine the partition which contains the segment, and add the object to the partition. Processing logic can determine a slot for the object based on the name of the object and the mapping of the name to a pattern based on a mapping function associated with the distribution pattern that maps object names to patterns. For example, the distribution pattern is an L-ring with a mapping function of phi. For example, for object "foo", the slot s=phi("foo"). Processing logic can determine the segment that contains the slot based on the number of slots in the set of slots (e.g., L-ring) and the granulation factor. For example, the segment n= (slot s)/(number of slots in the L-ring/granulation factor). In one example, if slots s is 3721425882, the segment n corresponding to slot s is: n=3721425882/((2^32)/32)= 3721425882/134217728=27. Processing logic can determine the partition which contains the segment based on the map of partitions. For example, if the object should be added to segment 27 and segment 27 is assigned to partition 4 in the map of partitions, processing logic will determine that the object should be added to bucket 4 corresponding to partition 4. Processing logic can then add the object to the bucket using the "add" method of the bucket.

In some embodiments, upon initializing an optimal fair distribution among buckets of different capacities, processing logic can remove objects (e.g., files) from the buckets in the distributed system. Processing logic can remove an object using the process described above for adding an object to the buckets, except that instead of using the "add" method of the corresponding bucket, processing logic will use the "remove" method of the corresponding bucket. One embodiment of performing operations such as the list, add and remove operations is described below in reference to FIG. 7.

Figure 4:
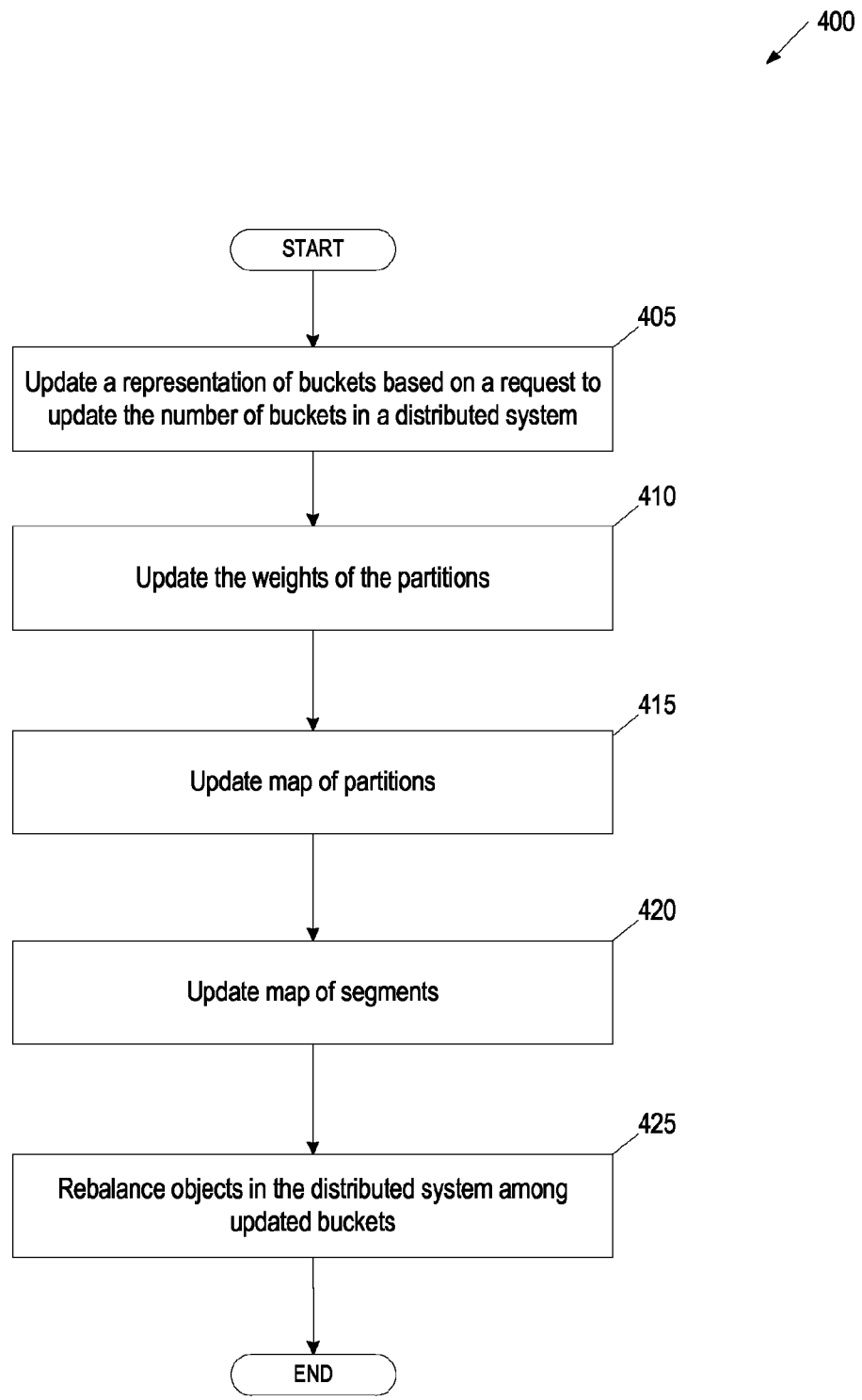
FIG. 4 is a flow diagram illustrating an embodiment for a method of changing the number of buckets in an optimal fair distribution among buckets of different capacities in a distributed file system, in accordance with an embodiment.

FIG. 4 is a flow diagram of an embodiment of a method 400 of changing the number of buckets in an optimal fair distribution among buckets of different capacities in a distributed file system. The method 400 is performed by processing logic that may comprise hardware (circuitry, dedicated logic, etc.), software (such as is run on a general purpose computer system or a dedicated machine), or a combination of both. In one embodiment, the method 400 is performed by the OCFD module 200 of FIG. 2.

At block 405, processing logic updates a representation of buckets based on a request to update the number of buckets in a distributed system. In one embodiment, the request is to increase the number of buckets in the distributed system, such as by adding one or more buckets. In an alternate embodiment, the request is to reduce the number of buckets in the distributed system, such as by removing one or more buckets. The request to update the number of buckets is generated by a change in the number of buckets in the distributed system. For example, if a bucket is added to the distributed system, a partition representing the partition needs to be generated. In another example, if a bucket is removed from the distributed system, a partition representing the partition needs to be removed. Processing logic can update a representation of the buckets in a distributed system by adding or removing a number of buckets in the request from an array or other data structure that represents the buckets. For example, for a request to add a bucket to a current set of buckets C with N elements will result in an updated set of buckets C' with N+1 elements. For example, for a request to remove a bucket from a current set of buckets C with N elements will result in an updated set of buckets C' with N−1 elements.

At block 410, processing logic updates the weights of the partitions. The updated weight of each partition can represent the capacity in the distributed system with the new set of buckets. The updated weight of the partition can be calculated based on the total number of segments and the updated total capacity of the buckets, and normalized ensure all segments in the distribution pattern are accounted for in the weights of the partitions. In one embodiment, the updated weight of each partition is calculated as:

weight of partition=(total number of segments*capacity of bucket corresponding to the partition)/(updated total capacity of all buckets)

For example, a distributed system previously had 5 buckets with capacity=19, 7, 12, 8, and 23, respectively, weights of partitions=8, 3, 4, 3, and 10, respectively, and a request is received to add a bucket to the distributed system. The updated set of buckets has 6 buckets: bucket 0 with capacity=19, bucket 1 with capacity=7, bucket 2 with capacity=12, bucket 3 with capacity=8, bucket 4 with capacity=23, and bucket 5 with capacity=12. For this example, the total capacity of the buckets is 19+7+12+8+23+12=81. Therefore, the updated weight of each partitions is:

Weight of partition 0=(32*19)/81=7
Weight of partition 1=(32*7)/81=2
Weight of partition 2=(32*12)/81=4
Weight of partition 3=(32*8)/81=3
Weight of partition 4=(32*23)/81=9
Weight of partition 5=(32*12)/81=4

In another example, a distributed system previously had 6 buckets with capacity=19, 7, 12, 8, 23, and 12, respectively, weights of partitions=8, 3, 5, 3, 9, and 4, respectively, and processing logic obtains a request to remove bucket 4. The updated set of buckets has 4 buckets: bucket 0 with capacity=19, bucket 1 with capacity=7, bucket 2 with capacity=12, bucket 3 with capacity=8, and bucket 4 with capacity=12. For this example, the total capacity of the buckets is 19+7+12+8+12=58. Therefore, the updated weight of each partition is:

Weight of partition 0=(32*19)/58=10
Weight of partition 1=(32*7)/58=3
Weight of partition 2=(32*12)/58=6
Weight of partition 3=(32*8)/58=4
Weight of partition 4=(32*12)/58=6

In some embodiments, to calculate the updated weight of each partition, processing logic can normalize the updated weight of each partition corresponding to the bucket to ensure all segments of the distribution pattern are accounted for in the weights of the partitions. Processing logic can normalize the weight by determining if all the segments in the distribution pattern are accounted for in the weights of the partitions. Processing logic can determine if all the segments of the distribution pattern are accounted for by calculating the total updated weights of the partitions and comparing the total (e.g., sum) of the updated weights of the partitions to the total number of segments. If processing logic determines that all of the segments are not accounted for in the weights of the partitions (e.g., by determining that the total number of segments is greater than the total updated weights of the partitions), processing logic can normalize (e.g., increase) the updated weights of one or more of the partitions. Using the previous example of adding a bucket, where the weights of the partitions were 7, 2, 4, 3, 9, and 4, and the total number of segments was 32, processing logic will determine there are 3 segments (32−(7+2+4+3+9+4)=3) that are not accounted for in the weights of the partitions. In this example, processing logic normalizes the updated weights of the partitions by adjusting the updated weights of the first 3 partitions to receive an additional segment, such that:

Weight of partition 0=weight of partition 0+1=7+1=8,
Weight of partition 1=weight of partition 1+1=2+1=3,
Weight of partition 2=weight of partition 2+1=4+1=5,
Weight of partition 3=weight of partition 3=3,
Weight of partition 4=weight of partition 4=9,
Weight of partition 5=weight of partition 5=4.

In other embodiments, the weights of the partitions can be normalized in other ways without departing from the scope of the current disclosure.

At block 415, processing logic updates the map of partitions. Processing logic can update the map of partitions by calculating a defect value for each partition corresponding to a bucket in the original number of buckets and fixing the map of partitions based on the defect value(s). If the updated number of buckets in the distributed system is greater than the original number of buckets (e.g., adding one or more buckets to the distributed system), the defect value is the number of segments in an original partition that will be moved to the new partition(s) corresponding to the new bucket(s) added to the distributed system. If the updated number of buckets in the distributed system is less than the original number of buckets (e.g., removing one or more buckets from the distributed system), the defect value is the number of segments from the removed partition that will be added to each of the remaining partitions corresponding to the remaining bucket(s) in the distributed system.

If the updated number of buckets in the distributed system is greater than the original number of buckets, processing logic can calculate the defect value by subtracting, for each of the original partitions, the updated weight of the partition (in the updated distributed system with more buckets) from the original weight of the partition (in the original distributed system with fewer buckets). For example, for an original distributed system with 5 buckets with weights of partitions of 9, 4, 6, 3, and 10, respectively, and an updated distributed system with 6 buckets with weights of partitions of 8, 3, 5, 3, 9, respectively for the first 5 buckets, the defect for each of the original partitions is calculated as:

Defect of partition 0=9−8=1,
Defect of partition 1=4−3=1,
Defect of partition 2=6−5=1,
Defect of partition 3=3−3=0,
Defect of partition 4=10−9=1.

Therefore, the new partition (partition 5 corresponding to the new bucket) will receive one segment from partition 0, one segment from partition 1, one segment from partition 2, no segments from partition 3, and one segment from partition 4.

If the updated number of buckets in the distributed system is less than the original number of buckets, processing logic can calculate the defect value by subtracting, for each of the updated partitions, the original weight of the partition (in the original distributed system with more buckets) from the updated weight of the partition (in the updated distributed system with fewer buckets). For example, an original distributed system had 6 buckets with weights of partitions of 8, 3, 5, 3, 9, and 4, respectively, and the updated distributed system removes bucket 4 resulting in 5 buckets with weights of partition 11, 4, 7, 4, and 6 respectively. In this example, the defect for each of the updated partitions is:

Defect of partition 0=11−8=3,
Defect of partition 1=4−3=1,

Defect of partition 2=7−5=2,
Defect of partition 3=4−3=1,
Defect of partition 5, which is now partition 4 in the updated distributed system=6−4=2 (because partition 4 was removed from the distribution pattern because its corresponding bucket was removed from the original distributed system, thus the weight of the original partition 4 is not used).

Therefore, the updated partition 0 will receive 3 segments from the original partition 4, the updated partition 1 will receive 1 segment from the original partition 4, the updated partition 2 will receive 2 segments from the original partition 4, the updated partition 3 will receive 2 segments from the original partition 4 and the updated partition 4 (which is the original partition 5) will receive 2 segments from the original partition 4.

Processing logic can fix the map of partitions based on the defects by updating the map of partitions based on the defect values. If the updated number of buckets in the distributed system is greater than the original number of buckets (e.g., adding one or more buckets to the distributed system), processing logic can update the map of partitions by overwriting a number of segments from each original partition with a value of the new partition based on the defect value of each original partition. For example, a last segment(s) assigned to each original partition in the map of partitions can be assigned to the new partition. For example, for a distributed system with an original number of 5 buckets and an updated number of 6 buckets with an original map of partitions {0 0 0 0 0 0 0 0 1 1 1 1 2 2 2 2 2 3 3 3 4 4 4 4 4 4 4 4 4} and the defect values for the 5 original partitions: 1, 1, 1, 0, 1, the updated map of partitions is: { 0 0 0 0 0 0 0 5 1 1 1 5 2 2 2 2 2 5 3 3 3 4 4 4 4 4 4 4 4 5}, where new partition 5 is assigned one segment from partition 0 based on partition 0's defect value of 1, new partition 5 is assigned one segment from partition 1 based on partition 1's defect value of 1, new partition 5 is assigned one segment from partition 2 based on partition 2's defect value of 1, new partition 5 is not assigned any segments from partition 3 based on partition 3's defect value of 0, and partition 5 is assigned one segment from partition 4 based on partition 4's defect value of 1.

If the updated number of buckets in the distributed system is less than the original number of buckets (e.g., removing one or more buckets from the distributed system), processing logic can update the map of partitions by overwriting the partition values in the map of partitions corresponding to the removed bucket with partition values of the remaining buckets based on the defect values for the buckets. Processing logic can further update the map of partitions by decrementing the partition values that are greater than the partition value of removed bucket(s) (e.g. decrementing by a value equal to the number of removed buckets). For example, a distributed system with an original map of partitions: {0 0 0 0 0 0 0 0 5 1 1 1 5 2 2 2 2 2 5 3 3 3 4 4 4 4 4 4 4 4 5} where partition 4 is removed, and with defect values of 3, 1, 2, 1, 2, respectively, will result in an updated map of partitions: {0 0 0 0 0 0 0 0 5 1 1 1 5 2 2 2 2 5 3 3 0 0 0 1 2 2 3 4 4 5}, where the first 3 elements belonging to removed partition 4 are assigned to partition 0 based on partition 0's defect value of 3, the next element belonging to removed partition 4 is assigned to partition 1 based on partition 1's defect value of 1, the next element belonging to removed partition 4 is assigned to partition 3 based on partition 3's defect value of 1, and the next 2 elements belonging to removed partition 4 are assigned to partition 4 based on partition 4's defect value of 2, and the next (last) element of removed partition 4 is assigned to partition 5 based on partition 5's defect value of 1. The updated map of partitions is then updated again to update the partition values that are greater than the partition value of the removed bucket (e.g., by decrementing the partition values that are greater than the partition value of the removed partition corresponding to the removed bucket). In the previous example, the partition value of 5 is decremented by one because one bucket (corresponding to partition 4) was removed. Therefore, in the previous example, the final updated map of partitions is: {0 0 0 0 0 0 0 0 4 1 1 1 4 2 2 2 2 2 4 3 3 3 0 0 0 1 2 2 3 4 4 4}.

At block 420, processing logic updates the map of segments. If the updated number of buckets in the distributed system is greater than the original number of buckets (e.g., adding one or more buckets to the distributed system), processing logic updates the map of segments by determining the segments that will be moved to the new partition(s) corresponding to the new bucket(s), forming vacancies in the map of segments, and filling the vacancies in the map of segments with the segments associated with the new partition(s). Processing logic can determine the segments that will be moved to the new partitions(s) based on the updated map of partitions by searching the map of partitions for elements with the number of the new partition(s). For example, if the new bucket is bucket number 5, the new partition corresponding to the new bucket is partition 5, so processing logic will search the map of partitions for the number 5. If the map of segments is implemented as an array, processing logic can form vacancies in the map of segments by shifting the elements of the map of segments by the number of segments in the new partition(s). The elements of the map of segments can be shifted by removing the elements in the map of segments that correspond to the segments moved to the new partition. For example, if the new bucket was assigned segments 8, 12, 18, and 31, the map of segments is shifted by removing the elements corresponding to elements 8, 12, 18, and 31, since these elements no longer belong to the partitions previously associated with those elements. In one embodiment, processing logic shifts the elements of the map of segments to the left. In an alternate embodiment, processing logic shifts the elements of the map of segments to the right. Processing logic can fill the vacancies in the map of segments with the segments associated with the new partition(s) by storing a number for each segment associated with the new partition(s) in each vacancy based on the map of partitions. For example, for a distributed system with a new bucket corresponding to a new partition with 4 segments, a map of partitions is: {0 0 0 0 0 0 0 0 0 5 1 1 2 2 2 2 2 5 3 3 3 4 4 4 4 4 4 4 4 5} and an original map of segments implemented as an array is: {0 1 2 3 4 5 6 7 8 9 10 11 12 13 14 15 16 17 18 19 20 21 22 23 34 25 26 27 28 29 30 31}, processing logic will shift the map of segments by 4 (such as by removing elements 8, 12, 18, and 31 which used to belong to partition 0, partition 1, partition 2, and partition 4 respectively but were reassigned to partition 5 upon the creation of bucket 5). This will create 4 vacancies for the 4 segments of the new partition ({0 1 2 3 4 5 6 7 9 10 11 13 14 15 16 17 19 20 21 22 23 34 25 26 27 28 29 30 x x x x}) and processing logic will fill the vacancies by the values of the new partition, such that the updated map of segments is: {0 1 2 3 4 5 6 7 9 10 11 13 14 15 16 17 19 20 21 22 23 24 25 26 27 28 29 30 8 12 18 31}. If the map of segments is allocated as a table, the map of segments is updated to be:

TABLE 2

Updated Map of Segments after Addition of Bucket

| Partition 0 | Partition 1 | Partition 2 | Partition 3 | Partition 4 | Partition 5 |
|---|---|---|---|---|---|
|  |  |  |  | 30 |  |
| 7 |  |  |  | 29 |  |
| 6 |  |  |  | 28 |  |
| 5 |  |  |  | 27 |  |
| 4 |  | 17 |  | 26 |  |
| 3 |  | 16 |  | 25 | 31 |
| 2 | 11 | 15 | 21 | 24 | 18 |
| 1 | 10 | 14 | 20 | 23 | 12 |
| 0 | 9 | 13 | 19 | 22 | 8 |

TABLE 3

Updated Map of Segments after Removal of Bucket

| Partition 0 | Partition 1 | Partition 2 | Partition 3 | Partition 4 (previously Partition 5) |
|---|---|---|---|---|
| 24 |  |  |  |  |
| 23 |  |  |  |  |
| 22 |  |  |  |  |
| 7 |  |  |  |  |
| 6 |  | 27 |  |  |
| 5 |  | 26 |  | 31 |
| 4 |  | 17 |  | 18 |
| 3 | 25 | 16 | 28 | 12 |
| 2 | 11 | 15 | 21 | 8 |
| 1 | 10 | 14 | 20 | 30 |
| 0 | 9 | 13 | 19 | 29 |

If the updated number of buckets in the distributed system is less than the original number of buckets (e.g., removing one or more buckets from the distributed system), processing logic updates the map of segments by removing the segments in the partition(s) corresponding to the removed bucket(s) from the map of segments, arranging the vacancies in the map of segments based on the remaining partitions, and filling the vacancies in the map of segments with segments associated with the remaining partitions. Processing logic can remove the segments in a removed partition corresponding to a removed bucket by accessing the map of segments using the removed partition. Processing logic can arrange the vacancies in the map of segments based on the remaining partitions by determining a number of additional segments for each of the remaining partitions based on the defect value for each of the remaining partitions and shifting the appropriate number of vacancies to each of the remaining partitions. For example, if partition 0 is to get 3 additional segments based on a defect value of 3 for partition 0, then processing logic will include 3 vacancies in the map of segments next to the existing segments for partition 0. Processing logic can fill the vacancies in the map of segments with the segments associated with the remaining partitions by storing a number for each segment associated with the one of the remaining partitions in each vacancy based on the map of partitions. For example, an original map of segments for a distributed system with 6 buckets is: {0 1 2 3 4 5 6 7 9 10 11 13 14 15 16 17 19 20 21 22 23 34 25 26 27 28 29 30 8 12 18 31}, bucket number 4 is removed corresponding to partition 4. Partition 4 corresponds to elements 22-30 of the map of segments, and the defect values for the updated distributed system are 3, 1, 2, 1, and 2. In this example, processing logic will shift the map of segments by 9 (e.g., removing elements 22-30 which belonged to partition 4. This will create 9 vacancies to be reallocated to the remaining partitions ({0 1 2 3 4 5 6 7 9 10 11 13 14 15 16 17 19 20 21 x x x x x x x x x 8 12 18 31}), with "x" representing a vacancy. In this example, processing logic will shift the vacancies such that partition 0 gets 3 vacancies based on its defect value of 3, partition 1 gets 1 vacancy based on its defect value of 1, partition 2 gets 2 vacancies based on its defect value of 2, partition 3 gets 1 vacancy based on its defect value of 1, and partition 5 (which has been updated to updated partition 4) will get 2 vacancies based on its defect value of 2. Thus, the updated map of segments will be {0 1 2 3 4 5 6 7 x x x 9 10 11 x 13 14 15 16 17 x x 19 20 21 x x x 8 12 18 31}. Processing logic will then fill the vacancies based on the updated map of partitions, such that the updated map of segments is: {0 1 2 3 4 5 6 7 22 23 24 9 10 11 25 13 14 15 16 17 26 27 19 20 21 28 29 30 8 12 18 31}. If the map of segments is allocated as a table, the map of segments is updated to be:

At block 425, processing logic rebalances the objects in the distributed system among the updated buckets. Processing logic can rebalance the objects in the distributed system among the updated buckets by obtaining a list of the objects in each bucket and for every object, determining a partition based on the updated map of partitions.

If the updated number of buckets in the distributed system is greater than the original number of buckets (e.g., adding one or more buckets to the distributed system), processing logic determines whether the partition of an object corresponds to the new bucket(s). If processing logic determines that the partition of an object corresponds to the new bucket(s), processing logic can remove the object from its current bucket and add the object to the new bucket.

If the updated number of buckets in the distributed system is less than the original number of buckets (e.g., removing one or more buckets from the distributed system), processing logic determines whether the partition of an object corresponds to the removed bucket(s). If processing logic determines that the partition of an object corresponds to the removed bucket(s), processing logic can remove the object from the removed bucket and add the object to one of the remaining buckets.

Processing logic can obtain a list of the objects in each bucket using the list method available for each bucket (e.g., by using the "list" method of the bucket). Processing logic can determine the partition for each object by determining a slot for the object, determining a segment which contains the slot, and determining the partition which contains the segment. Processing logic can determine a slot for the object based on the name of the object and a mapping function of the distribution pattern associated with the distributed system (e.g., mapping function phi for a distribution pattern using an L-ring). Processing logic can determine the segment that contains the slot based on the number of slots in the distribution pattern (e.g., L-ring) and the granulation factor. For example, serial number of the segment n=serial-number-of-slot s/number-of-slots-in-one-segment=(slot s)/(number of slots in the distribution pattern/granulation factor). Processing logic can determine the partition which contains the segment based on the map of partitions. For example, if the object is in segment 31 and segment 31 is assigned to partition 5 in the map of partitions, processing logic will determine that the object belongs in bucket 5. Processing logic can then remove the object from its current bucket by calling the method "old_bucket.remove("object")" to remove the object from its current bucket and by calling the "new_bucket.add("object")" to add the object to another bucket. One embodiment of performing operations such as the list, add and remove operations is described below in reference to FIG. 7.

Figure 5:
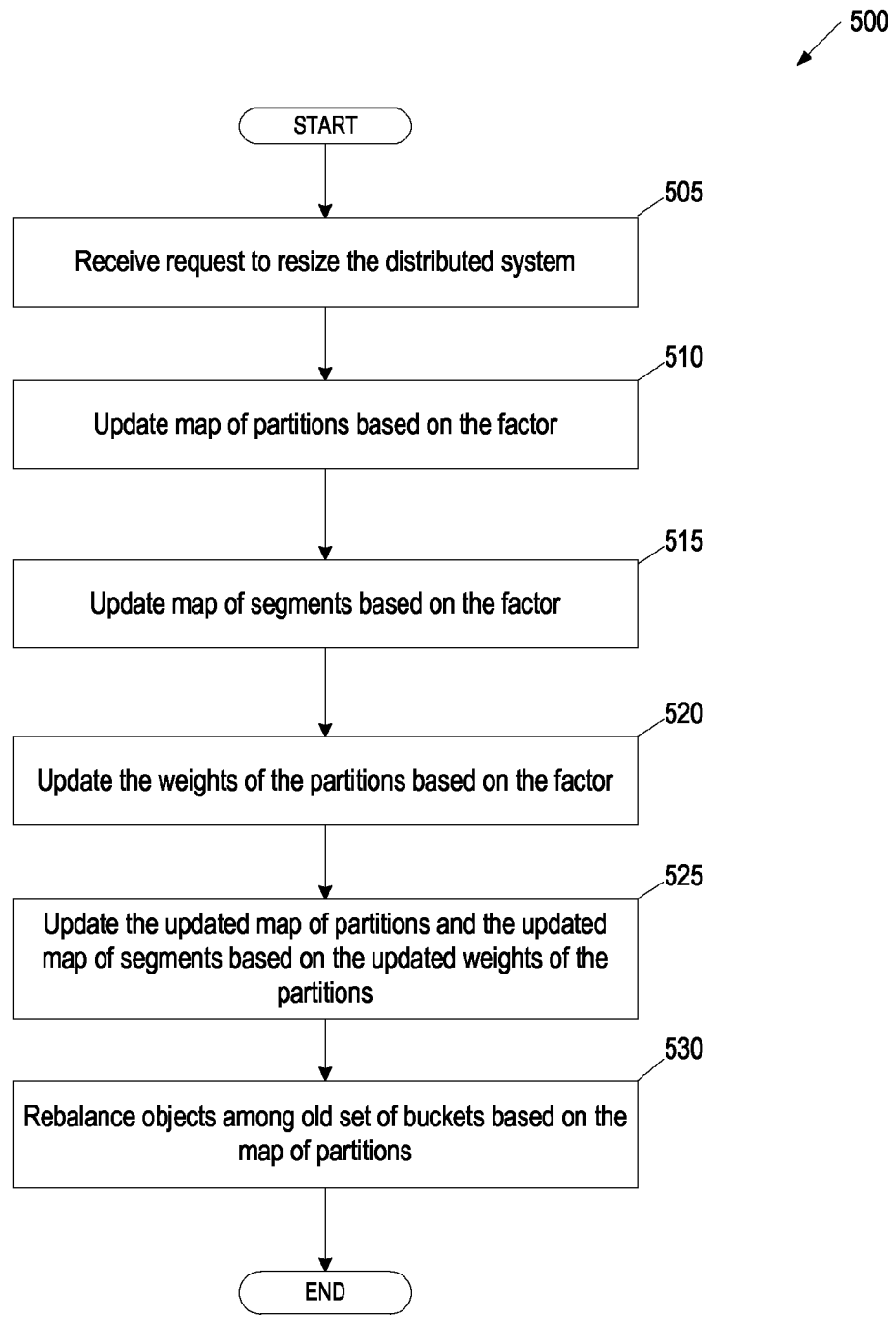
FIG. 5 is a flow diagram illustrating an embodiment for a method of resizing a distributed file system using an optimal fair distribution, in accordance with an embodiment.

FIG. 5 is a flow diagram of an embodiment of a method 500 of resizing a distributed file system. The method 500 is performed by processing logic that may comprise hardware (circuitry, dedicated logic, etc.), software (such as is run on a general purpose computer system or a dedicated machine), or a combination of both. In one embodiment, the method 500 is performed by the OCFD module 200 of FIG. 2.

At block 505, processing logic receives a request to resize a distributed system by a factor. The request to resize the distributed system can be a request to increase the capacity of the distributed system in buckets by a factor or a request to decrease the capacity of the distributed system in buckets by a factor. For example, the factor can be a multiple of 2, such as 2, 4, 6, etc. Based on the request, processing logic can calculate a new number of segments based on the factor, such as by updating (e.g., multiplying) the original number of segments in a distribution pattern associated with the distributed system by the factor. For example, if the distribution pattern had 16 segments and a request is received to increase the capacity of the distributed system by a factor of 2, then the updated number of segments will be 16*2=32 segments. For example, if the distribution pattern had 32 segments and a request is received to decrease the size of the distributed system by a factor of 2, then the updated number of segments will be 32*0.5=16 segments.

At block 510, processing logic updates a map of partitions based on the factor. If the request to resize the distributed system increases the capacity of the distributed system, processing logic can increase the size, or stretch, the map of partitions based on the factor. If the request to resize the distributed system decreases the capacity of the distributed system, processing logic can reduce the size, or shrink, the map of partitions based on the factor. Processing logic can stretch the map of partitions by allocating additional elements for the map of partitions based on the factor and assigning each partition additional segments based on the factor. For example, if the map of partitions has 32 segments and the factor to increase the size of the distributed system is 2, then the stretched map of partitions will have 32*2=64 segments, with each partition having twice as many segments as in the current map of partitions. For example, if a map of partitions had 32 segments: {0 0 0 0 0 0 0 0 4 1 1 1 4 2 2 2 2 2 4 3 3 3 0 0 0 1 2 2 3 4 4 4}, then the stretched map of partitions for a factor of 2 will have 64 segments: {0 0 0 0 0 0 0 0 0 0 0 0 0 0 0 0 4 4 1 1 1 1 1 1 4 4 2 2 2 2 2 2 2 2 2 2 4 4 3 3 3 3 3 3 0 0 0 0 0 0 1 1 2 2 2 2 3 3 4 4 4 4 4 4}. Processing logic can shrink the map of partitions by deallocating elements for the map of partitions based on the factor and removing a number of segments corresponding to the factor from each partition. For example, if the map of partitions had 64 segments and the factor to decrease the quality of distribution is 2, then the stretched map of partitions will have 64/2=32 segments (or 64*0.5=32), with each partition having half as many segments as in the current map of partitions.

At block 515, processing logic updates a map of segments based on the factor. If the request to change the size of the distributed system increases the capacity of the distributed system, processing logic can stretch a map of segments based on the factor. If the request to change the size of the distributed system decreases the capacity of the distributed system, processing logic can shrink the map of segments based on the factor.

Processing logic can stretch a map of segments by allocating additional storage for the map of partitions based on the factor and allocating additional segments for each partition based on the factor. For example, if the map of segments is allocated as an array of size 32 and the factor is 2, then a new array will be allocated of size 32*2=64 for the stretched map of segments, with each partition having twice as many segments as in the initial map of segments. In another example, if the map of segments is allocated as an array of size 32 and the factor is 2, an additional 32 elements will be allocated for the array for a total of 32+32=64 elements. In some embodiments, the elements in the map of segments are grouped such that the segments contained in a particular partition are grouped together. In these embodiments, the segments contained in each partition in the stretched map of segments are updated by assigning the elements in the stretched map of segments based on the weights of the partition. For example, for an original map of segments {0 1 2 3 4 5 6 7 22 23 24 9 10 11 25 13 14 15 16 17 26 27 19 20 21 28 29 30 8 12 18 31}, the stretched map of segments for a factor of 2 will be: {0 1 2 3 4 5 6 7 8 9 10 11 12 13 14 15 44 45 46 47 48 49 18 19 20 21 22 23 50 51 26 27 28 29 30 31 32 33 34 35 52 53 54 55 38 39 40 41 42 43 56 57 58 59 60 61 16 17 24 25 36 37 62 63}. In this example, segments 0-31 are originally in the array and segments 32-63 are the elements added to the array from stretching.

The segments in the stretched map of segments can be allocated to the partitions based on the weights of the partitions and based on the initial map of segments. If the initial map of segments contained a segment with number i, then the stretched map will get R segments with numbers R*i, R*i+1, . . . , R*i+(R−1), where R is the factor. For example, for a factor R=2, the stretched map of segments will gets segments:

0*2=0, 0*2+1=1 instead of segment 0 in the initial map of segments;

1*2=2, 1*2+1=3 instead of segment 1 in the initial map of segments;

...

31*2=62, 31*2+1=63 instead of segment 31 in the initial map of segments.

In another example, for a map of segments implemented as a table, the table size is increased to reflect the updated number of segments for the factor, and the segments are reallocated to the partitions.

For example, Table 4 shows a map of segments before stretching and Table 5 shows a map of segments after stretching.

TABLE 4

Map of Segments before Stretching

| Partition 0 | Partition 1 | Partition 2 | Partition 3 | Partition 4 |
|---|---|---|---|---|
| 24 | | | | |
| 23 | | | | |
| 22 | | | | |
| 7 | | | | |
| 6 | | 27 | | |
| 5 | | 26 | | 31 |
| 4 | | 17 | | 18 |
| 3 | 25 | 16 | 28 | 12 |
| 2 | 11 | 15 | 21 | 8 |
| 1 | 10 | 14 | 20 | 30 |
| 0 | 9 | 13 | 19 | 29 |

TABLE 5

Map of Segments after Stretching

| Partition 0 | Partition 1 | Partition 2 | Partition 3 | Partition 4 |
|---|---|---|---|---|
| 49 | | | | |
| 48 | | | | |
| 47 | | | | |
| 46 | | | | |
| 45 | | | | |
| 44 | | | | |
| 15 | | | | |
| 14 | | | | |
| 13 | | 55 | | |
| 12 | | 54 | | |
| 11 | | 53 | | 63 |
| 10 | | 52 | | 62 |
| 9 | | 35 | | 37 |
| 8 | | 34 | | 36 |
| 7 | 51 | 33 | 57 | 25 |
| 6 | 50 | 32 | 56 | 24 |
| 5 | 23 | 31 | 43 | 17 |
| 4 | 22 | 30 | 42 | 16 |
| 3 | 21 | 29 | 41 | 61 |
| 2 | 20 | 28 | 40 | 60 |
| 1 | 19 | 27 | 39 | 59 |
| 0 | 18 | 26 | 38 | 58 |

Processing logic can shrink the map of segments by deallocating elements for the map of segments based on the factor and removing a number of segments corresponding to the factor from each partition. For example, if the map of segments is allocated as an array of size 64 and the factor to decrease the quality of distribution is 2 (or change the quality of distribution by 0.5), then a new array will be allocated of size 64*0.5=32 or 64/2=32 for the shrunk map of segments, with each partition having half as many segments as in the initial map of segments. The map of segments can be shrunk in a similar manner as described above with respect to stretching the map of segments.

At block 520, processing logic updates the weights of the partitions based on the factor. To update the weights of the partitions, processing logic can calculate a scaled weight for each of the partitions based on the factor, calculate a normal weight for each of the partitions and determine whether any of the partitions have a positive defect or a negative defect.

To calculate the scaled weight for each partition based on the factor, processing logic can update (e.g., multiply) the weight of the partition by the factor. For example, the scaled weight of a partition=original weight of the partition*factor. For example, if the weights of the partitions were 10, 4, 8, 4, and 6 and the size of the distributed system is reduced by half, the scaled weights for a factor of 0.5 would be 5, 2, 4, 2, and 3 respectively. In another example, if the weights of the partitions were 11, 4, 7, 4, 6 for the 5 partitions, the scaled weights for a factor of 2 would be 11*2=22, 4*2=8, 7*2-14, 4*2=8, and 6*2=12.

To calculate the normal weight for each partition, processing logic can calculate the weights of the partitions based on the updated number of segments in the system and normalize the weights. For example, for a distribution pattern with 64 segments and 5 buckets with capacity 19, 7, 12, 8, and 12, respectively, the weights of the corresponding partitions are:
Weight of partition 0=(64*19)/58=20
Weight of partition 1=(64*7)/58=7
Weight of partition 2=(64*12)/58=13
Weight of partition 3=(64*8)/58=8
Weight of partition 4=(32*12)/58=13

Processing logic can normalize the weight of each partition corresponding to the bucket by determining if all the segments in the distribution pattern are accounted for based on the weights of the partitions and updating one or more of the weights if all the weights of the segments in the distribution pattern are not accounted for. Processing logic can determine if all the segments of the distribution pattern are accounted for based on the weights of the partitions by calculating the sum of the weights of the partitions and comparing the sum of the weights of the partitions to the total number of segments. If processing logic determines that the total number of segments is greater than the sum of the weights of the partitions, processing logic will determine that all of the segments are not accounted for in the weights of the partitions and can normalize (e.g., increase) the value of the weights of one or more of the partitions. Using the previous example, where the weights of the partitions were 20, 7, 13, 8, 13, and the total number of segments was 64, processing logic will determine there are 3 segments (64−(20+7+13+8+13)=3) that not accounted for in the weights of the partitions. In this example, processing logic normalizes the weights of the partitions by adjusting the weights of the first 3 partitions to receive an additional segment, such that the weight of partition 0=weight of partition 0+1=20+1=21, the weight of partition 1=weight of partition 1+1=7+1=8, the weight of partition 2=weight of partition 2+1=13+1=14, the weight of partition 3=weight of partition =8, and the weight of partition 4=weight of partition 4=13.

At processing block 525, processing logic can update the updated map of partitions and the updated map of segments based on the updated weights of the partitions. Processing logic can update the updated (stretched or shrunk) map of partitions and the updated (stretched or shrunk) map of segments based on the updated weights of the partitions by determining if any of the partitions have a positive defect or a negative defect and updating the updated map of partitions and the updated map of segments based on the positive defect or the negative defect.

Processing logic can calculate a number of positive defects and a number of negative defects between the normal weights and the scaled weights. A positive defect is a difference between the scaled weight and the normal weight for a partition where the scaled weight is greater. A negative defect is a different between the scaled weight and the normal weight where the normal weight is greater. For example, for scaled weights of 22, 8, 14, 8, and 12 and normal weights of 21, 8, 14, 8, and 13, there will be a positive defect=1 for partition 0 because 22 is greater than 21 and a negative defect=1 for partition 4 because 13 is greater than 12.

Processing logic can move a number of segments equal to the positive defect value from the partition with the positive defect value to a partition with a negative defect value by updating the updated map of partitions and the updated map of segments. Using the previous example, a segment from partition 0 will be moved to partition 4 by updating the updated map of partitions and the updated map of segments.

Processing logic can update the updated map of partitions by determining a segment(s) (e.g., last segment(s)) in the updated map of partitions that belongs to the partition with the positive defect and assigning that segment to the partition with the negative defect. For example, a segment needs to be moved from partition 0 to partition 4 with a updated map of partitions {0 0 0 0 0 0 0 0 0 0 0 0 0 0 0 0 4 4 1 1 1 1 1 1 4 4 2 2 2 2 2 2 2 2 2 2 4 4 3 3 3 3 3 3 0 0 0 0 0 0 1 1 2 2 2 2 3 3 4 4 4 4 4 4}. In this example, processing logic will determine that the last segment belonging to partition 0 in the updated (stretched) map of partitions is segment 49 and will assign segment 49 to partition 4, resulting in an updated updated map of partitions {0 0 0 0 0 0 0 0 0 0 0 0 0 0 0 0 4 4 1 1 1 1 1 1 4 4 2 2 2 2 2 2 2 2 2 4 4 3 3 3 3 3 3 0 0 0 0 0 4 1 1 2 2 2 2 3 3 4 4 4 4 4 4}, which has segment 49 belonging to partition 4.

Processing logic can update the updated map of segments by removing a number of elements from the partition with the positive defect equal to the number of positive defects, creating an element for the partition with the negative defect equal to the number of negative defects, and filling the created element(s) in the map of segments with the elements removed from the partition with the positive defects. For example, for a stretched map of segments {0 1 2 3 4 5 6 7 8 9 10 11 12 13 14 15 44 45 46 47 48 49 18 19 20 21 22 23 50 51 26 27 28 29 30 31 32 33 34 35 52 53 54 55 38 39 40 41 42 43 56 57 58 59 60 61 16 17 24 25 36 37 62 63} that requires moving a segment 49 from partition 0 to partition 4, segment 49 will be removed from partition 0 in the map of segments, an element for partition 4 will be created by left shifting the elements of partition 4, and the created element will be filled with segment 49. The resulting map of segments will be: {0 1 2 3 4 5 6 7 8 9 10 11 12 13 14 15 44 45 46 47 48 18 19 20 21 22 23 50 51 26 27 28 29 30 31 32 33 34 35 52 53 54 55 38 39 40 41 42 43 56 57 58 59 60 61 16 17 24 25 36 37 62 63 49}.

At block 530, processing logic rebalances the objects among the buckets based on the updated map of partitions. Processing logic can rebalance the objects among the buckets by obtaining a list of the objects in each bucket, determining if any of the named objects in the bucket corresponds to a partition whose segments were updated in the map of partitions, removing the object from the bucket corresponding to the partition that used to include the segment, and moving the object to a bucket corresponding to the partition that currently includes the segment if the named object corresponds to a partition whose segments were updated. For example, if a segment 49 was moved from partition 0 to partition 4 based on the updated map of partitions, and a file was in the bucket corresponding to segment 49, the file would have to be removed from bucket 0 and added to bucket 4.

Processing logic can obtain a list of the objects in each bucket corresponding to an updated partition using the list method available for each bucket. Processing logic can determine the partition for each object by determining a slot for the object, determining a segment which contains the slot, and determining the partition which contains the segment. Processing logic can determine a slot for the object based on the name of the object and a mapping function of the distribution pattern associated with the distributed system (e.g., mapping function phi for a distribution pattern using an L-ring). Processing logic can determine the segment that contains the slot based on the number of slots in the distribution pattern (e.g., L-ring) and the granulation factor. For example, serial number of the segment n=serial-number-of-slot s/number-of-slots-in-one-segment=(slot s)/(number of slots in the distribution pattern/granulation factor). Processing logic can compare the partition to which a segment was previously assigned in a previous map of partitions or map of segments to the partition to which the segment is currently assigned to determine if the segment was updated. If the segment was updated, processing logic can then remove the object from its current bucket associated with the previous segment by calling the method "old_bucket.remove("object")" to remove the object from its current bucket and by calling the "new_bucket.add("object")" to add the object to the bucket corresponding to the partition associated with the segment. One embodiment of performing operations such as the list, add and remove operations is described below in reference to FIG. 7.

Figure 6:
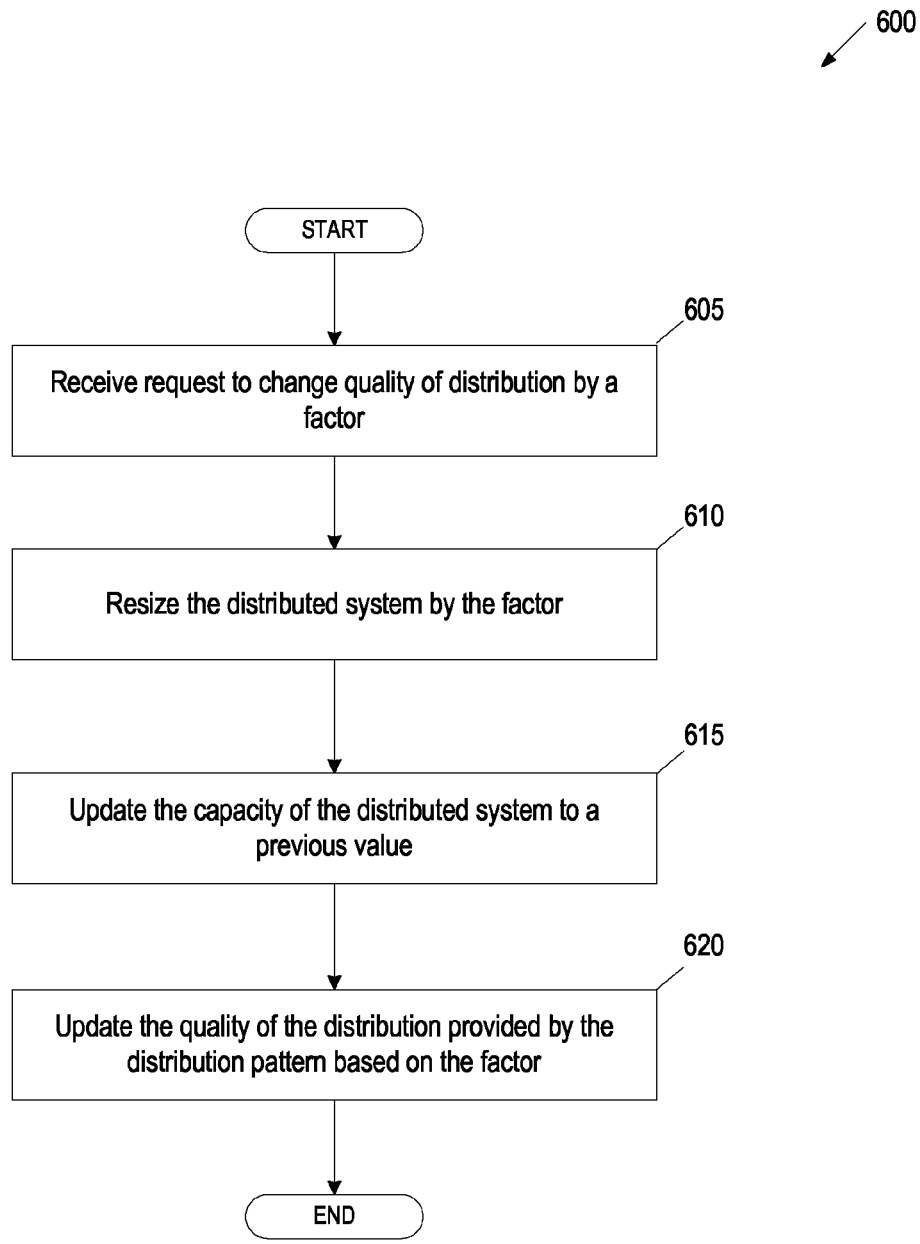
FIG. 6 is a flow diagram illustrating an embodiment for a method of changing the quality of distribution in an optimal fair distribution among buckets of different capacities in a distributed file system, in accordance with an embodiment.

FIG. 6 is a flow diagram of an embodiment of a method 600 of changing the quality of distribution in a distributed file system. The method 600 is performed by processing logic that may comprise hardware (circuitry, dedicated logic, etc.), software (such as is run on a general purpose computer system or a dedicated machine), or a combination of both. In one embodiment, the method 600 is performed by the OCFD module 200 of FIG. 2.

At block 605, processing logic receives a request to change the quality of distribution of a distributed system by a factor. The request to change the quality of distribution of the distributed system can be a request to increase the quality of distribution of the distributed system by a factor or a request to decrease the quality of distribution of the distributed system by a factor. For example, the factor can be a multiple of 2, such as 2, 4, 6, etc.

At block 610, processing logic can resize the distributed system by the factor. For example, for a request to change the quality of distribution of the distributed system by a factor of 2, the size of the distributed system will be increased by a factor of 2. One embodiment of resizing the distributed system by the factor is described above with reference to FIG. 5.

At block 615, processing logic updates the capacity of the distributed system to a previous (e.g., original) value. For example, upon receiving a request to increase the quality of distribution by a factor, processing logic may have updated the capacity of the distributed system by the factor in order to resize the distributed system, such as to stretch or shrink the map of partitions, map of segments, etc. Once the capacity has been updated to resize the system, processing logic can update the capacity of the distributed system to a previous value by performing a calculation on the current capacity of the distributed system (after the resize) based on the factor. For example, if the current capacity of the system is 32*2=64 after the distributed system has been resized, and the factor is 2, then the capacity will be updated to the previous value of 64/2=32.

At block 620, processing logic updates the quality of the distribution provided by the distributed file system based on the factor by performing a calculation on the quality of distribution associated with the distribution pattern used by the distributed system based on the factor. For example, processing logic can multiply the quality of the distribution by the factor to calculate the updated quality of the distribution. For example, for a quality of distribution of 2 and a factor of 2, the updated quality of the distribution can be 2*2=4.

Figure 7:
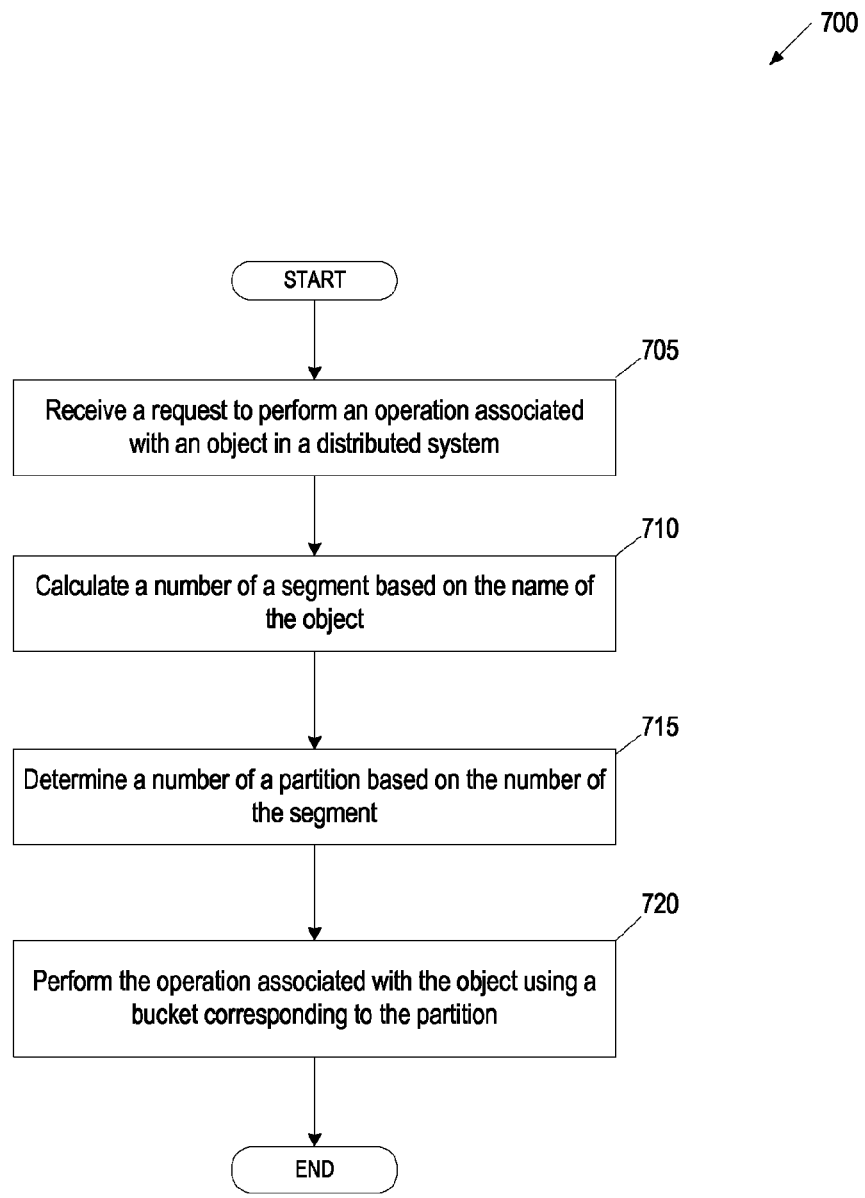
FIG. 7 is a flow diagram illustrating an embodiment for a method of performing an operation on an object using an optimal fair distribution, in accordance with an embodiment.

FIG. 7 is a flow diagram of an embodiment of a method 700 of performing an operation on an object using an optimal fair distribution. The method 700 is performed by processing logic that may comprise hardware (circuitry, dedicated logic, etc.), software (such as is run on a general purpose computer system or a dedicated machine), or a combination of both. In one embodiment, the method 700 is performed by the OCFD module 200 of FIG. 2.

At block 705, processing logic receives a request to perform an operation associated with an object in a distributed system. The request to perform an operation associated with an object in the distributed system can be a request to add an object to a bucket in the distributed system, remove an object from a bucket in the distributed system, lookup an object in the distributed system, list the objects in a bucket, etc. The request can include a name of the object on which to perform the operation (e.g., object "foo").

At block 710, processing logic calculates a number of a segment based on the name of the object. Processing logic can calculate a number of the segment based on the name of the object by determining a slot for the object and determining a segment that contains the slot. Processing logic can determine a slot for the object based on the name of the object and the mapping of the name to a pattern based on a mapping function associated with the distribution pattern that maps object names to patterns. For example, the distribution pattern is an L-ring with a mapping function of phi. For example, for object "foo", the slot s=phi("foo"). Processing logic can determine the segment that contains the slot based on the number of slots in the set of slots (e.g., L-ring) and the granulation factor. For example, the segment n=(slot s)/(number of slots in the L-ring/granulation factor). In one example, if slots s is 3721425882, the segment n corresponding to slot s is: n=3721425882/((2^32)/32)= 3721425882/134217728=27.

At block 715, processing logic determines a number of a partition based on the number of the segment. Processing logic can determine the partition which contains the segment based on the map of partitions. For example, if the object should be added to segment 27 and segment 27 is assigned to partition 4 in the map of partitions, processing logic will determine that the object should be added to partition 4.

At block 720, processing logic can perform the operation associated with the object using a bucket corresponding to the partition. Processing logic can perform the operation associating with the object by determining a bucket corresponding to the partition and using a bucket operation for the bucket that corresponds to the operation in the request. Each bucket has a capacity that is a non-zero positive integer number (e.g., size of the partition) and a set of 4 methods: lookup an object, list, add an object, and remove an object. The lookup an object method can return a true value (Boolean true, positive value, etc.) if the bucket contains an object with a provided name and a false value (Boolean false, negative value, zero value, etc.) if the bucket does not contain an object with a provided name. For example, lookup("foo") returns Boolean value true if the bucket contains object "foo" and Boolean value false if the bucket does not contain object "foo". The list method can return a list of names of all the objects in the bucket. For example, if the bucket C includes objects A and B, the list method will return a list including A and B. The add an object method can add an object to the bucket. For example, add("foo") for bucket C will add the object named "foo" to the bucket C. The remove method can remove an object from the bucket. For example, remove ("foo") for bucket C will remove the object named "foo" from the bucket C.

Figure 8:
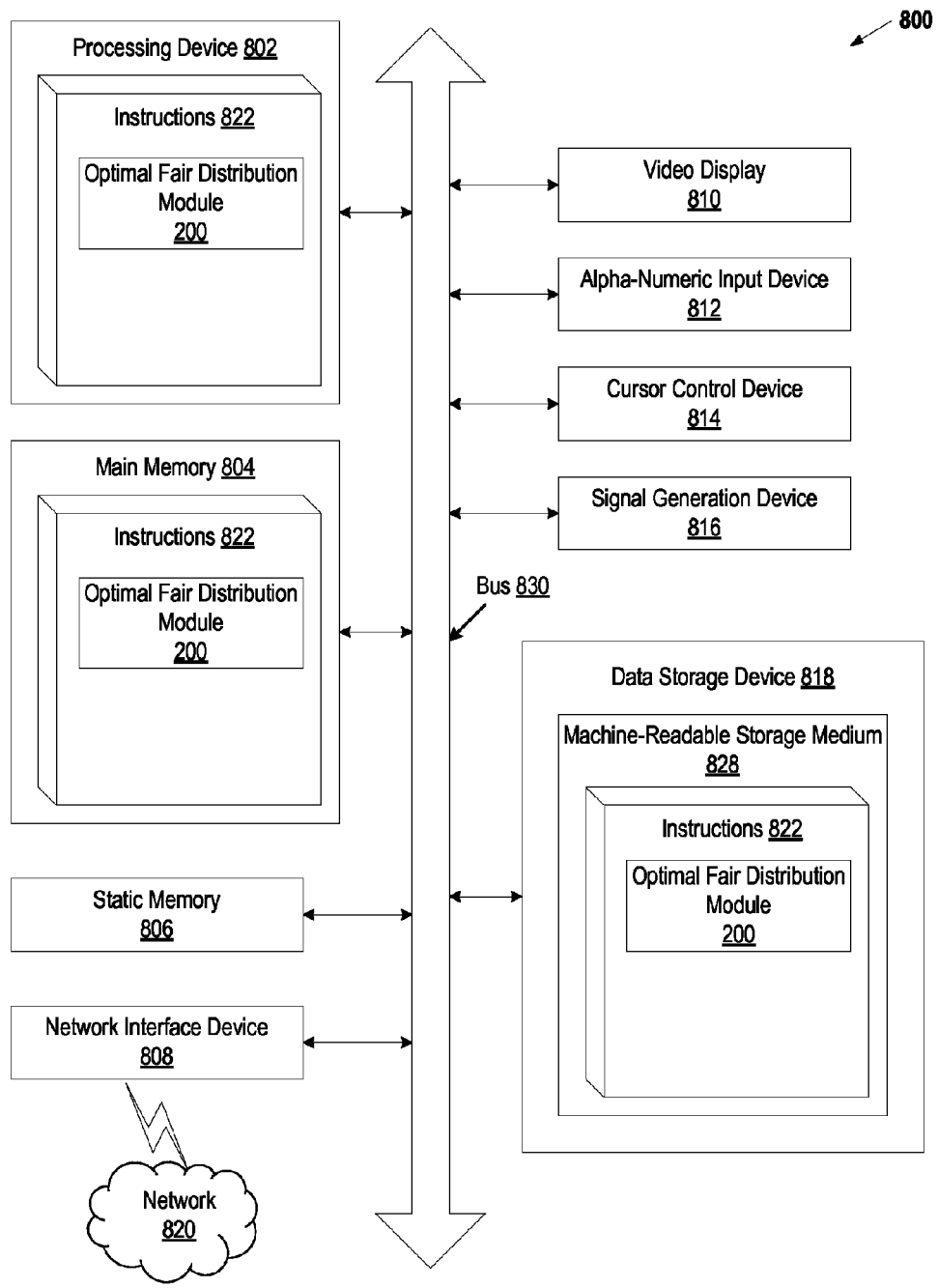
FIG. 8 is a block diagram of an exemplary computer system that may perform one or more of the operations described herein.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 822 for performing the operations and steps discussed herein.

The computer system 800 may further include a network interface device 808 communicably coupled to a network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium 828 (also known as a computer-readable medium) on which is stored one or more sets of instructions or software 822 embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting machine-readable storage media.

In one implementation, the instructions 822 include instructions for a file optimal fair distribution module 200 (such as optimal fair distribution module 200 of FIG. 2) and/or a software library containing methods that call a optimal fair distribution module. While the machine-readable storage medium 828 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

dividing, by a processing device executing a client of a distributed system, a distribution pattern associated with the distributed system into a plurality of segments in view of a quality of distribution for the distributed system, wherein the distribution pattern comprises a plurality of partitions, wherein the distributed system comprises a plurality of buckets, and wherein a bucket of the plurality of buckets is associated with a set of the plurality of partitions;

for a partition of the plurality of partitions, calculating, by the processing device, a weight for the partition in view of a number of segments in the plurality of segments, a capacity of a bucket associated with the partition, and a total capacity of the plurality of buckets;

generating, by the processing device, a map of partitions in view of at least the weight for the partition, wherein the map of partitions comprises a mapping of each segment in the distribution pattern to a respective partition that comprises the segment;

distributing, by the processing device, a plurality of objects in the distributed system to the plurality of buckets in view of the map of partitions;

receiving a request to update a number of the plurality of buckets in the distributed system;

generating an updated number of the plurality of buckets in view of the request; and updating the weight for the partition in view of the updated number of the plurality of buckets.

2. The method of claim 1, wherein the number of segments in the distributed system is calculated in view of the quality of distribution and a maximum number of buckets in the distributed system.

3. The method of claim 1, further comprising:

generating a map of segments in view of the weight for each of the plurality of partitions, wherein the map of segments comprises a mapping of each partition in the distribution pattern to a set of segments comprising the partition.

4. The method of claim 3, further comprising:

for each partition of a subset of the plurality of partitions, updating a respective weight in view of the updated number of the plurality of buckets;

updating the map of partitions in view of updating of weights for the plurality of partitions to generate an updated map of partitions;

updating the map of segments in view of the updating of the weights for the plurality of partitions; and rebalancing the plurality of objects in the distributed system to the updated number of the plurality of buckets in view of the updated map of partitions.

5. The method of claim 4, wherein updating the weight for the partition in view of the updated number of the plurality of buckets and further the capacity of the bucket associated with the partition comprises:

calculating an updated weight for the partition in view of the capacity of the bucket associated with the partition and the total capacity of the plurality of buckets in the distributed system; and normalizing the updated weight for the partition in view of the number of segments in the distribution pattern.

6. The method of claim 4, wherein updating the map of partitions comprises calculating a defect value for each bucket of the plurality of buckets and fixing the map of partitions in view of the defect value.

7. The method of claim 3, further comprising:
receiving a request to resize the distributed system, the request comprising a resize factor;
updating the map of partitions in view of the factor to generate an updated map of partitions;
updating the map of segments in view of the factor to generate an updated map of segments;
for each partition of the plurality of partitions, updating a respective weight in view of the factor;
changing the updated map of partitions in view of the updating the respective weight of each of the plurality of partitions to generate a changed updated map of partitions;
changing the updated map of segments in view of the updating the respective weight of each of the plurality of partitions; and
balancing the plurality of objects in the distributed system to the plurality of buckets in view of the changed updated map of partitions.

8. The method of claim 1, further comprising:
receiving a request to change the quality of distribution of the distribution pattern associated with the distributed system;
resizing the distributed system in view of the request to change the quality of distribution;
updating a current capacity of the distributed system to a previous value; and
updating the quality of distribution of the distribution pattern associated with the distributed system in view of the request to change the quality of distribution of the distributed system.

9. The method of claim 1, wherein the distribution pattern is an L-ring comprising a plurality of slots, and wherein the L-ring comprises a mapping function to map a name associated with each of the plurality of objects to a slot of the plurality of slots in the L-ring, and
wherein distributing the plurality of objects in the distributed system to the plurality of buckets comprises:
for each of the plurality of objects:
calculating a slot for the object using the mapping function on the name of the object,
calculating a segment comprising the slot for the object in view of the quality of distribution,
determining a partition comprising the segment in view of the map of partitions, and
adding the object to a bucket corresponding to the partition comprising the segment.

10. A non-transitory computer readable storage medium comprising instructions that, when executed by a processing device, cause the processing device to:
divide a distribution pattern associated with a distributed system into a plurality of segments in view of a quality of distribution for the distributed system, wherein the distribution pattern comprises a plurality of partitions, wherein the distributed system comprises a plurality of buckets, and wherein a bucket of the plurality of buckets is associated with a plurality of the plurality of partitions;
for a partition of the plurality of partitions, calculate, by the processing device, a weight for the partition in view of a number of segments in the plurality of segments, a capacity of a bucket associated with the partition, and a total capacity of the plurality of buckets;
generate a map of partitions in view of at least the weight for the partition, wherein the map of partitions comprises a mapping of each segment in the distribution pattern to a respective partition that comprises the segment;
distribute a plurality of objects in the distributed system to the plurality of buckets in view of the map of partitions;
receive a request to update a number of the plurality of buckets in the distributed system;
generate an updated number of the plurality of buckets in view of the request; and
update the weight for the partition in view of the updated number of the plurality of buckets.

11. The non-transitory computer readable storage medium of claim 10, including further instructions that, when executed by the processing device, cause the processing device to:
for each partition of a subset of the plurality of partitions, update a respective weight in view of the updated number of the plurality of buckets;
update the map of partitions in view of updating of weights for the plurality of partitions to generate an updated map of partitions;
update a map of segments in view of the updating of the weights for the plurality of partitions, wherein the map of segments comprises a mapping of each partition in the distribution pattern to a set of segments comprising the partition; and
rebalance the plurality of objects in the distributed system to the updated number of the plurality of buckets in view of the updated map of partitions.

12. The non-transitory computer readable storage medium of claim 11, wherein to update the weight for the partition in view of the updated number of the plurality of buckets and further the capacity of the bucket associated with the partition comprises:
calculate an updated weight for the partition in view of the capacity of the bucket associated with the partition and the total capacity of the plurality of buckets in the distributed system; and
normalize the updated weight for the partition in view of the number of segments in the distribution pattern.

13. The non-transitory computer readable storage medium of claim 10, including further instructions that, when executed by the processing device, cause the processing device to:
receive a request to resize the distributed system, the request comprising a resize factor;
update the map of partitions in view of the factor to generate an updated map of partitions;
update a map of segments in view of the factor to generate an updated map of segments, wherein the map of segments comprises a mapping of each partition in the distribution pattern to a set of segments comprising the partition;
for each partition of the plurality of partitions, update a respective weight in view of the factor;
change the updated map of partitions in view of the update to the respective weight of each of the plurality of partitions to generate a changed updated map of partitions;
change the updated map of segments in view of the update to the respective weight of each of the plurality of partitions; and
balance the plurality of objects in the distributed system to the plurality of buckets in view of the changed updated map of partitions.

14. The non-transitory computer readable storage medium of claim 10, including further instructions that, when executed by the processing device, cause the processing device to:
- receive a request to change the quality of distribution of the distribution pattern associated with the distributed system;
- resize the distributed system in view of the request to change the quality of distribution;
- update a current capacity of the distributed system to a previous value; and
- update the quality of distribution of the distribution pattern associated with the distributed system in view of the request to change the quality of distribution of the distributed system.

15. The non-transitory computer readable storage medium of claim 10, wherein the distribution pattern is an L-ring comprising a plurality of slots, and wherein the L-ring comprises a mapping function to map a name associated with each of the plurality of objects to a slot of the plurality of slots in the L-ring, and
- wherein to distribute the plurality of objects in the distributed system to the plurality of buckets, the non-transitory computer readable storage medium including further instructions that, when executed by the processing device, cause the processing device to:
  - for each of the plurality of objects:
    - calculate a slot for the object using the mapping function on the name of the object,
    - calculate a segment comprising the slot for the object in view of the quality of distribution,
    - determine a partition comprising the segment in view of the map of partitions, and
    - add the object to a bucket corresponding to the partition comprising the segment.

16. A computing device comprising:
a memory; and
a processing device, operatively coupled to the memory, to:
- divide a distribution pattern associated with a distributed system into a plurality of segments in view of a quality of distribution for the distributed system, wherein the distribution pattern comprises a plurality of partitions, wherein the distributed system comprises a plurality of buckets, and wherein a bucket of the plurality of buckets is associated with a plurality of the plurality of partitions;
- for a partition of the plurality of partitions, calculate, by the processing device, a weight for the partition in view of a number of segments in the plurality of segments, a capacity of a bucket associated with the partition, and a total capacity of the plurality of buckets;
- generate a map of partitions in view of at least the weight for the partition, wherein the map of partitions comprises a mapping of each segment in the distribution pattern to a respective partition that comprises the segment;
- distribute a plurality of objects in the distributed system to the plurality of buckets in view of the map of partitions;
- receive a request to update a number of the plurality of buckets in the distributed system;
- generate an updated number of the plurality of buckets in view of the request; and
- update the weight for the partition in view of the updated number of the plurality of buckets.

17. The computing device of claim 16, wherein the processing device is further to:
- for each partition of a subset of the plurality of partitions, update a respective weight in view of the updated number of the plurality of buckets;
- update the map of partitions in view of updating of weights for the plurality of partitions to generate an updated map of partitions;
- update a map of segments in view of the updating of the weights for the plurality of partitions, wherein the map of segments comprises a mapping of each partition in the distribution pattern to a set of segments comprising the partition; and
- rebalance the plurality of objects in the distributed system to the updated number of the plurality of buckets in view of the updated map of partitions.

18. The computing device of claim 17, wherein to update the weight for the partition in view of the updated number of the plurality of buckets and further the capacity of the bucket associated with the partition, the processing device is further to:
- calculate an updated weight for the partition in view of the capacity of the bucket associated with the partition and the total capacity of the plurality of buckets in the distributed system; and
- normalize the updated weight for the partition in view of the number of segments in the distribution pattern.

19. The computing device of claim 16, wherein the processing device is further to:
- receive a request to resize the distributed system, the request comprising a resize factor;
- update the map of partitions in view of the factor to generate an updated map of partitions;
- update a map of segments in view of the factor to generate an updated map of segments, wherein the map of segments comprises a mapping of each partition in the distribution pattern to a set of segments comprising the partition;
- for each partition of the plurality of partitions, update a respective weight in view of the factor;
- change the updated map of partitions in view of the update to the respective weight of each of the plurality of partitions to generate a changed updated map of partitions;
- change the updated map of segments in view of the update to the respective weight of each of the plurality of partitions; and
- balance the plurality of objects in the distributed system to the plurality of buckets in view of the changed updated map of partitions.

20. The computing device of claim 16, wherein the processing device is further to:
- receive a request to change the quality of distribution of the distribution pattern associated with the distributed system;
- resize the distributed system in view of the request to change the quality of distribution;
- update a current capacity of the distributed system to a previous value; and
- update the quality of distribution of the distribution pattern associated with the distributed system in view of the request to change the quality of distribution of the distributed system.

21. The computing device of claim 16, wherein the distribution pattern is an L-ring comprising a plurality of slots, and wherein the L-ring comprises a mapping function to map a name associated with each of the plurality of objects to a slot of the plurality of slots in the L-ring, and
wherein to distribute the plurality of objects in the distributed system to the plurality of buckets, the processing device is further to:
for each of the plurality of objects:
calculate a slot for the object using the mapping function on the name of the object,
calculate a segment comprising the slot for the object in view of the quality of distribution,
determine a partition comprising the segment in view of the map of partitions, and
add the object to a bucket corresponding to the partition comprising the segment.

* * * * *